(12) United States Patent
Chen et al.

(10) Patent No.: US 12,316,877 B2
(45) Date of Patent: May 27, 2025

(54) HIGH-LEVEL SYNTAX CONTROL FLAGS FOR TEMPLATE MATCHING-RELATED CODING TOOLS IN VIDEO CODING

(71) Applicant: QUALCOMM Incorporated, San Diego, CA (US)

(72) Inventors: Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 38 days.

(21) Appl. No.: 18/338,886

(22) Filed: Jun. 21, 2023

(65) Prior Publication Data

US 2024/0015333 A1 Jan. 11, 2024

Related U.S. Application Data

(60) Provisional application No. 63/367,793, filed on Jul. 6, 2022.

(51) Int. Cl.
*H04N 19/70* (2014.01)
*H04N 19/176* (2014.01)

(52) U.S. Cl.
CPC ........... *H04N 19/70* (2014.11); *H04N 19/176* (2014.11)

(58) Field of Classification Search
None
See application file for complete search history.

(56) References Cited

U.S. PATENT DOCUMENTS

2019/0007699 A1  1/2019  Liu et al.
2023/0090700 A1*  3/2023  Teng ................... H04N 19/105
375/240.02

FOREIGN PATENT DOCUMENTS

WO  2022063729 A1  3/2022

OTHER PUBLICATIONS

Chen C.C., et al., "AHG6: ECM Software Configuration Parameters for Template Matching Tools", JVET-AA0132-v2, Joint Video Experts Team (JVET) of ITU-T SG 16 WP 3 and ISO/IEC JTC 1/SC 29, 27th Meeting, by Teleconference, m60108, Jul. 6, 2022, Jul. 13-22, 2022, XP030302986, 3 Pages.
Coban M., et al., (Editors): "Algorithm Description of Enhanced Compression Model 5 (ECM 5)", 138. MPEG Meeting, Apr. 25, 2022-Apr. 29, 2022, Online, (Motion Picture Expert Group or ISO/IEC JTC1/SC29/WG11), No. M59895, Jul. 4, 2022, 45 Pages, XP030302684.
International Search Report and Written Opinion—PCT/US2023/026077—ISA/EPO—Oct. 9, 2023.

(Continued)

*Primary Examiner* — Clifford Hilaire
(74) *Attorney, Agent, or Firm* — Shumaker & Sieffert, P.A.

(57) ABSTRACT

A device for decoding video data comprises one or more processors configured to: obtain a syntax element from a bitstream that includes an encoded representation of the video data; determine, based on the syntax element, that a template-matching tool is enabled; based on the template-matching tool being enabled, applying the template-matching tool to generate a prediction block for a current coding unit (CU) of the video data; and reconstruct the current CU based on the prediction block for the current CU.

26 Claims, 16 Drawing Sheets

(56) References Cited

OTHER PUBLICATIONS

Jang H., et al., "Non-EE2: SPS Flag to Control TM-Based Merge/ amvp and Multi-pass DMVR Separately", Teleconference, Apr. 20, 2022-Apr. 29, 2022, (The Joint Video Exploration Team of ISO/IEC JTC1/SC29/WG11 and ITU-T SG.16 ), No. JVET-Z0219-V1, m59760, Apr. 21, 2022, pp. 3, XP030301166.

Jang H., et al., "Non-EE2: Support MMVD and Affine MMVD Without Template Matching Process", Teleconference, Apr. 20, 2022-Apr. 29, 2022, (The Joint Video Exploration Team of ISO/IEC JTC1/SC29/WG11 and ITU-T SG.16 ), No. JVET-Z0078-V1, m59396, Apr. 13, 2022, XP030300858, pp. 4.

Naser K., et al., "Evaluation of Template Matching Prediction for VVC", Teleconference, Jan. 6, 2021-Jan. 15, 2021, (The Joint Video Exploration Team of ISO/IEC JTC1/SC29/WG11 and ITU-T SG. 16 ), No. JVET-U0048, Dec. 28, 2020, 6 Pages, XP030293085.

Ohm J-R: "Meeting Report of the 27th Meeting of the Joint Video Experts Team (JVET)", Teleconference, Jul. 13, 2022-Jul. 22, 2022, (The Joint Video Exploration Team of ISO/IEC JTC1/SC29/WG11 and ITU-T SG.16), No. JVET-AA1000- v1, m60609, Aug. 18, 2022, XP030304217, pp. 217.

Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334.

Browne A., et al., "Algorithm description for Versatile Video Coding and Test Model 17(VTM17)", JVET-Z2002-v2, Joint Video Experts Team (JVET) of ITU-T SG 16 WP 3 and ISO/IEC JTC 1/SC 29, 26th Meeting, by teleconference, Apr. 20-29, 2022, pp. 1-134.

Chen C-C., et al., "AHG6: ECM Software Configuration Parameters for Template Matching Tools", Qualcomm, JVET-AA0132-v1, JVET-AA0132, Jul. 13-22, 2022, 6 Pages.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen Y-W., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-44.

Coban M., et al., "Algorithm Description of Enhanced Compression Model 5 (ECM 5)", JVET-Z2025, Joint Video Experts Team (JVET) of ITU-T SG 16 WP 3 and ISO/IEC JTC 1/SC 29, 26th Meeting, by Teleconference, Apr. 20-29, 2022, pp. 1-45.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "Exploration Experiment on Enhanced Compression beyond VVC capability (EE2)", JVET-Z2024-v2, Joint Video Experts Team (JVET) of ITU-T SG 16 WP 3 and ISO/IEC JTC 1/SC 29, 26th Meeting, by teleconference, Apr. 20-29, 2022, pp. 1-12.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Wang Y-K., et al., "High Efficiency Video Coding (HEVC) Defect Report", 14. JCT-VC Meeting; Jul. 25, 2013-Feb. 8, 2013; Vienna; (Joint Collaborative Team on Video Coding of ISO/IEC JTC1/SC29/WG11 and ITU-TSG.16); Url: http://wftp3.itu.int/av-arch/jctvc-site/, No. JCTVC-N1003, Sep. 27, 2013 (Sep. 27, 2013), 311 Pages, XP030114947.

\* cited by examiner

HIGH-LEVEL SYNTAX CONTROL FLAGS FOR TEMPLATE MATCHING-RELATED CODING TOOLS IN VIDEO CODING

This application claims the benefit of U.S. Provisional Patent Application 63/367,793, filed Jul. 6, 2022, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to high-level syntax control for template matching related tools. The disclosed methods can be applied to any of the existing video codecs, such as HEVC (High Efficiency Video Coding), VVC (Versatile Video Coding), Essential Video Coding (EVC) or be an efficient coding feature in future video coding standards (e.g., ECM (Enhanced Compression Model)). ECM and other video codecs may implement a variety of template matching tools. However, for specific types of video content or when targeting specific types of video decoders, it may not be advantageous to use one or more of the template matching tools. For instance, less sophisticated video decoders may not have the computational resources to use the template matching tools. However, encoded bitstreams do not include data indicating whether template matching tools are enabled. This may lead to decoding problems, such as decoding errors, if a video decoder attempts to decode a bitstream generated using template matching tools that the video decoder is not equipped to use.

Techniques of this disclosure may address this problem. For instance, a video encoder may signal a syntax element that indicates whether a template-matching tool is enabled. If the template-matching tool being enabled, the video encoder may apply the template-matching tool to generate a prediction block for a current CU of the video data. Similarly, a video decoder may obtain a syntax element from a bitstream that includes an encoded representation of the video data. Depending on the value of the syntax element, the video decoder may apply the template-matching tool to generate a prediction block for a current coding unit (CU) of the video data. Because the video encoder signals the syntax element, the decoding problems discussed above may be avoided.

In one example, this disclosure describes a device for decoding video data, the device comprising: a memory comprising one or more storage media, the memory configured to store the video data; and one or more processors implemented in circuitry, the one or more processors configured to: obtain a syntax element from a bitstream that includes an encoded representation of the video data; determine, based on the syntax element, that a template-matching tool is enabled; based on the template-matching tool being enabled, apply the template-matching tool to generate a prediction block for a current coding unit (CU) of the video data; and reconstruct the current CU based on the prediction block for the current CU.

In another example, this disclosure describes a device for encoding video data, the device comprising: a memory comprising one or more storage media, the memory configured to store the video data; and one or more processors implemented in circuitry, the one or more processors configured to: signal, in a bitstream that includes an encoded representation of the video data, a syntax element that indicates whether a template-matching tool is enabled; based on the template-matching tool being enabled, apply the template-matching tool to generate a prediction block for a current coding unit (CU) of the video data; and encode the current CU based on the prediction block for the current CU.

In another example, this disclosure describes a method of decoding video data, the method comprising: obtaining a syntax element from a bitstream that includes an encoded representation of the video data; determining, based on the syntax element, that a template-matching tool is enabled; based on the template-matching tool being enabled, applying the template-matching tool to generate a prediction block for a current coding unit (CU) of the video data; and reconstructing the current CU based on the prediction block for the current CU.

In another example, this disclosure describes a method of encoding video data, the method comprising: signaling, in a bitstream that includes an encoded representation of the video data, a syntax element that indicates whether a template-matching tool is enabled; based on the template-matching tool being enabled, applying the template-matching tool to generate a prediction block for a current coding unit (CU) of the video data; and encoding the current CU based on the prediction block for the current CU.

In one example, this disclosure describes a method of decoding video data, the method comprising: obtaining a syntax element from a bitstream that includes an encoded representation of the video data; determining, based on the syntax element, that a template-matching tool is enabled; based on the template-matching tool being enabled, applying the template-matching tool to generate a prediction block for a current coding unit (CU) of the video data; and reconstructing the current CU based on the prediction block for the current CU.

In another example, this disclosure describes a method of encoding video data, the method comprising: signaling a syntax element in a bitstream that includes an encoded representation of the video data, a syntax element, wherein the syntax element indicates that a template-matching tool is enabled; based on the template-matching tool being enabled, applying the template-matching tool to generate a prediction block for a current coding unit (CU) of the video data; and encoding the current CU based on the prediction block for the current CU.

In another example, this disclosure describes a device includes one or more means for performing the method of any of claims of this disclosure.

In another example, a computer-readable storage medium is encoded with instructions that, when executed, cause a programmable processor to perform the method of any of claims of this disclosure.

The details of one or more examples are set forth in the accompanying drawings and the description below. Other features, objects, and advantages will be apparent from the description, drawings, and claims.

DETAILED DESCRIPTION

A video coder (e.g., a video encoder or a video decoder) may use template matching coding tools to generate prediction block for coding units (CUs) of video data. In Enhanced Compression Model (ECM) proposals there is no systematic design for high-level syntax to switch template matching coding tools on and off. This disclosure describes high level syntax elements for enabling or disabling template matching coding tools. The use of high-level syntax elements for enabling and disabling template matching coding tools may enhance coding efficiency, accelerate encoding and/or decoding speeds, and/or provide other advantages.

For example, a video encoder may signal, in a bitstream that includes an encoded representation of the video data, a syntax element that indicates whether a template-matching tool is enabled. Based on the template-matching tool being enabled, the video encoder may apply the template-matching tool to generate a prediction block for a current CU of the video data. The video encoder may encode the current CU based on the prediction block for the current CU. Similarly, a video decoder may obtain a syntax element from a bitstream that includes an encoded representation of the video data. The video decoder may determine, based on the syntax element, that a template-matching tool is enabled. Based on the template-matching tool being enabled, the video decoder may apply the template-matching tool to generate a prediction block for a current coding unit (CU) of the video data. The video decoder may reconstruct the current CU based on the prediction block for the current CU. By signaling the syntax element that indicates whether the template-matching tool is enabled, it may be determined, prior to the video decoder attempting to reconstruct the current CU or the bitstream, whether the video decoder is configured to decode the current CU or the bitstream. By avoiding attempts to decode a CU or bitstream that the video decoder is unable to decode, decoding errors may be avoided.

Figure 1:
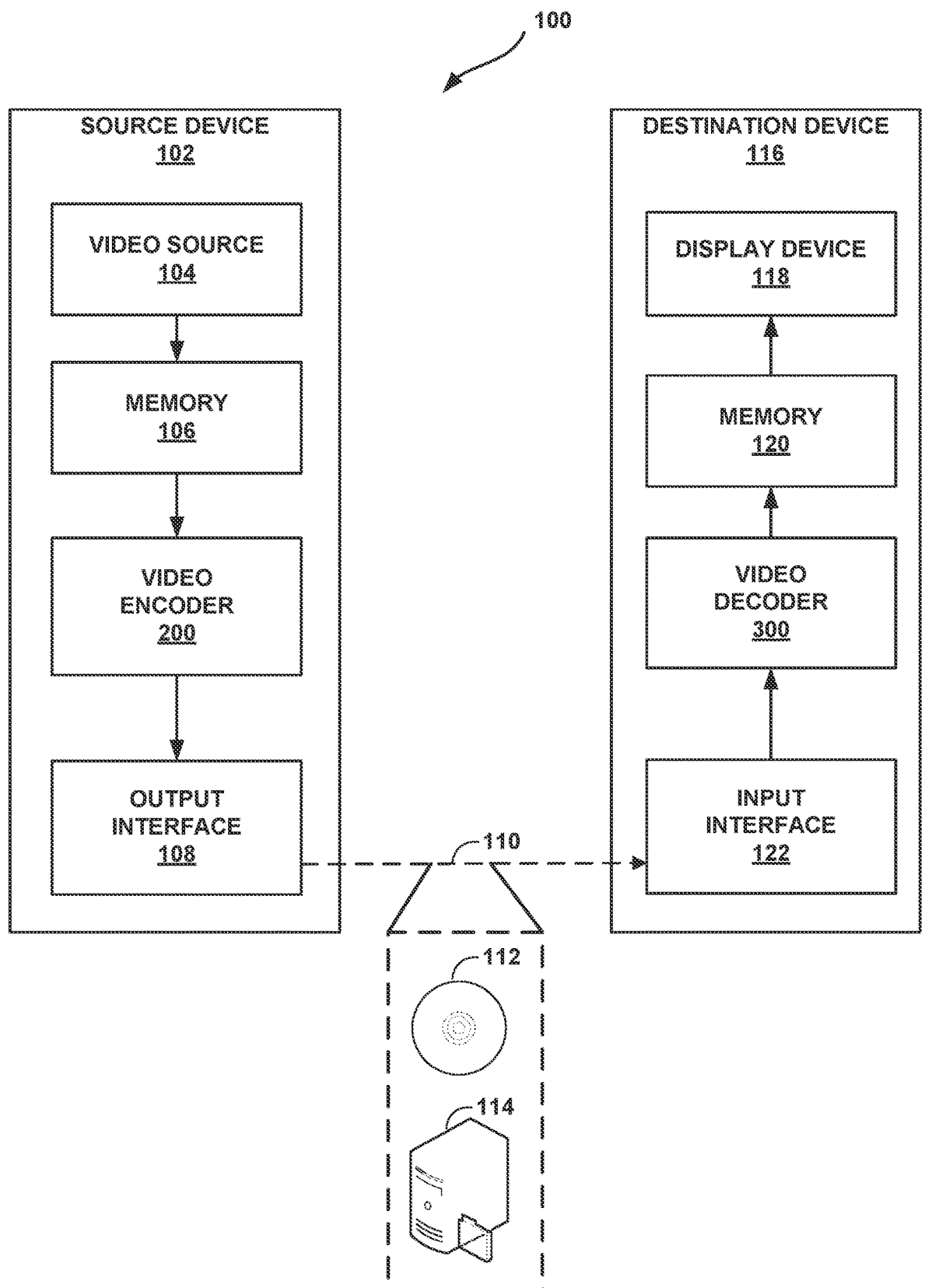
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116. In particular, source device 102 provides encoded video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template matching-related coding tools. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for template matching-related coding tools. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. Memory 106 and memory 120 may include one or more storage media. such as RAM, ROM, EEPROM, CD-ROM or other optical disk storage, magnetic disk storage, or other magnetic storage devices, flash memory, or any other medium that can be used to store data or program code. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template-matching tools.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks.

Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In HEVC, the largest coding unit in a slice is called a coding tree block (CTB) or coding tree unit (CTU). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, e.g., inter or intra. When a CU is inter-coded, the CU may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter-coded, each PU has one set of motion information, which is derived with a unique inter prediction mode.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index may be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Figure 2A:
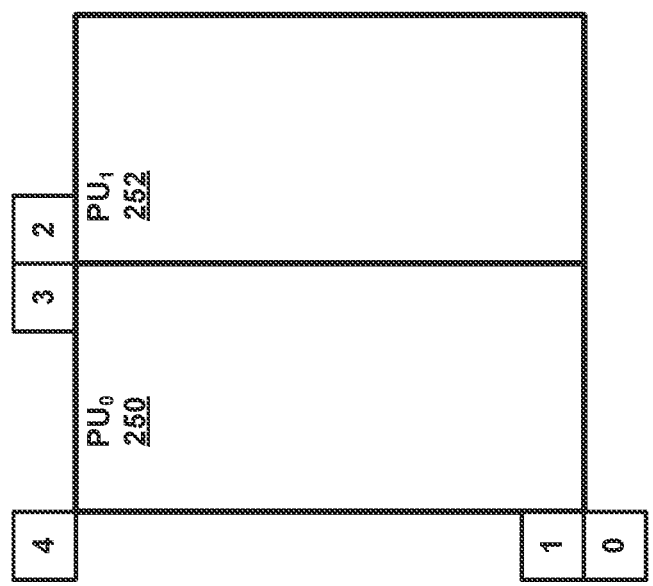
FIG. 2A and FIG. 2B are conceptual diagrams illustrating spatial neighboring motion vector (MV) candidates for merge mode and Advanced Motion Vector Prediction (AMVP) modes.
Figure 2B:
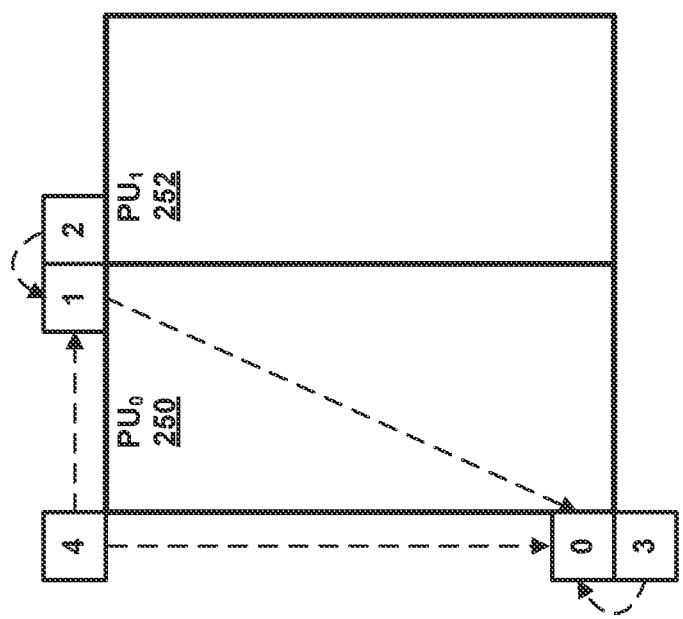

FIG. 2A and FIG. 2B are conceptual diagrams illustrating spatial neighboring MV candidates for merge mode and AMVP modes. Spatial MV candidates are derived from the neighboring blocks shown in FIG. 2A and FIG. 2B, for a specific PU ($PU_0$) 250, although the methods generating the candidates from the blocks differ for merge and AMVP modes. FIG. 2A and FIG. 2B also show an adjacent PU ($PU_1$) 252

In merge mode, up to four spatial MV candidates can be derived with the orders showed in FIG. 2A with numbers, and the order is the following: left (0, A1), above (1, B1), above right (2, B0), below left (3, A0), and above left (4, B2), as shown in FIG. 2A.

In AMVP mode, the neighboring blocks are divided into two groups: left group consisting of block 0 and 1, and above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that none of the neighboring blocks contain a motion vector pointing to the same reference picture. Therefore, if such a candidate cannot be found, the video coder (e.g., video encoder 200 or video decoder 300) may scale the first available candidate to form the final candidate, thus the temporal distance differences can be compensated.

In HEVC, a temporal motion vector predictor (TMVP) candidate, if enabled and available, is added into the MV candidate list after spatial motion vector candidates. The process of motion vector derivation for a TMVP candidate is the same for both merge and AMVP modes, however the target reference index for the TMVP candidate in the merge mode is always set to 0.

Figure 3A:
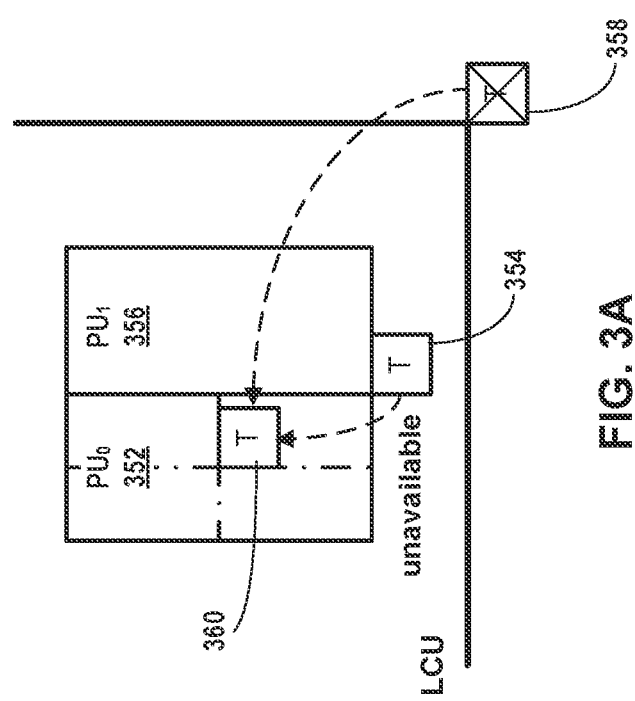
FIG. 3A and FIG. 3B are conceptual diagrams illustrating a temporal motion vector predictor (TMVP) candidate and MV scaling.
Figure 3B:
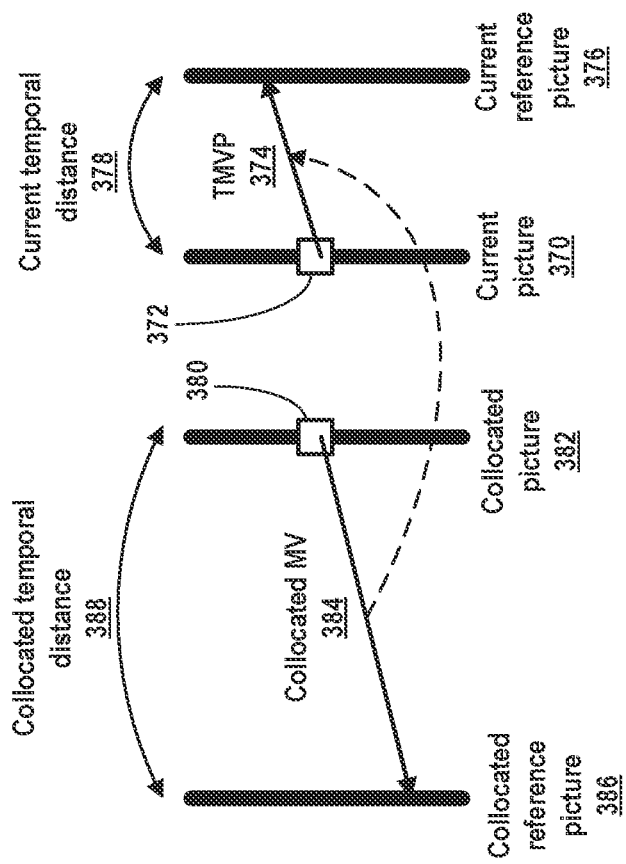

FIG. 3A and FIG. 3B are conceptual diagrams illustrating a TMVP candidate and MV scaling. A primary block location 350 for TMVP candidate derivation for a current PU 352 ($PU_0$) is the bottom right block outside 354 of a collocated PU 356 ($PU_1$) as shown in FIG. 3A as a block "T", to compensate the bias to the above and left blocks used to generate spatial neighboring candidates. However, if that block is located outside of the current CTB row or motion information is not available (e.g., as shown by block 358), the block is substituted with a center block 360 of current PU 352.

A motion vector for a TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV may be scaled to compensate the temporal distance differences, as shown in FIG. 3A and FIG. 3B.

Motion vector scaling is now discussed. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In the example of FIG. 3B, a current picture 370 has a current PU 372. A TMVP 374 of current PU 372 indicates a location in a current reference picture 376. A current temporal distance 378 is the difference between current picture 370 and current reference picture 376. However, to derive TMVP 374, the video coder may refer to a collocated PU 380 that is collocated with current PU 372. The picture containing collocated PU 380 may be referred to as collocated picture 382. A motion vector of collocated PU 380 may be referred to as collocated MV 384. Collocated MV 384 may indicate a location in another reference picture (referred to a collocated reference picture 386). The distance between collocated picture 382 and collocated reference picture 386 may be referred to as collocated temporal distance 388. Collocated temporal distance 388 may be different from current temporal distance 378. Accordingly, collocated MV 384 is scaled based on collocated temporal distance 388 and current temporal distance 378 to determine TMVP 374.

Artificial motion vector candidate generation is now discussed. If a motion vector candidate list is not complete, video encoder 200 or video decoder 300 may generate artificial motion vector candidates and may insert the artificial motion vector candidates at the end of the list until the list has all candidates. In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

A pruning process for candidate insertion is now discussed. Candidates from different blocks may happen to be the same, which decreases the efficiency of a merge/AMVP candidate list. A pruning process is applied to solve this problem. The pruning process compares one candidate against the others in the current candidate list to avoid inserting identical candidate in certain extent. To reduce the complexity, only limited numbers of comparisons are applied instead of comparing each potential one with all the other existing ones.

Template Matching Advanced Motion Vector Prediction (TM-AMVP) and Template Matching Merge (TM-MRG) are now discussed. Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. Template matching is applied to both AMVP and regular merge mode called respectively as TM-AMVP and TM-MRG modes.

Figure 4:
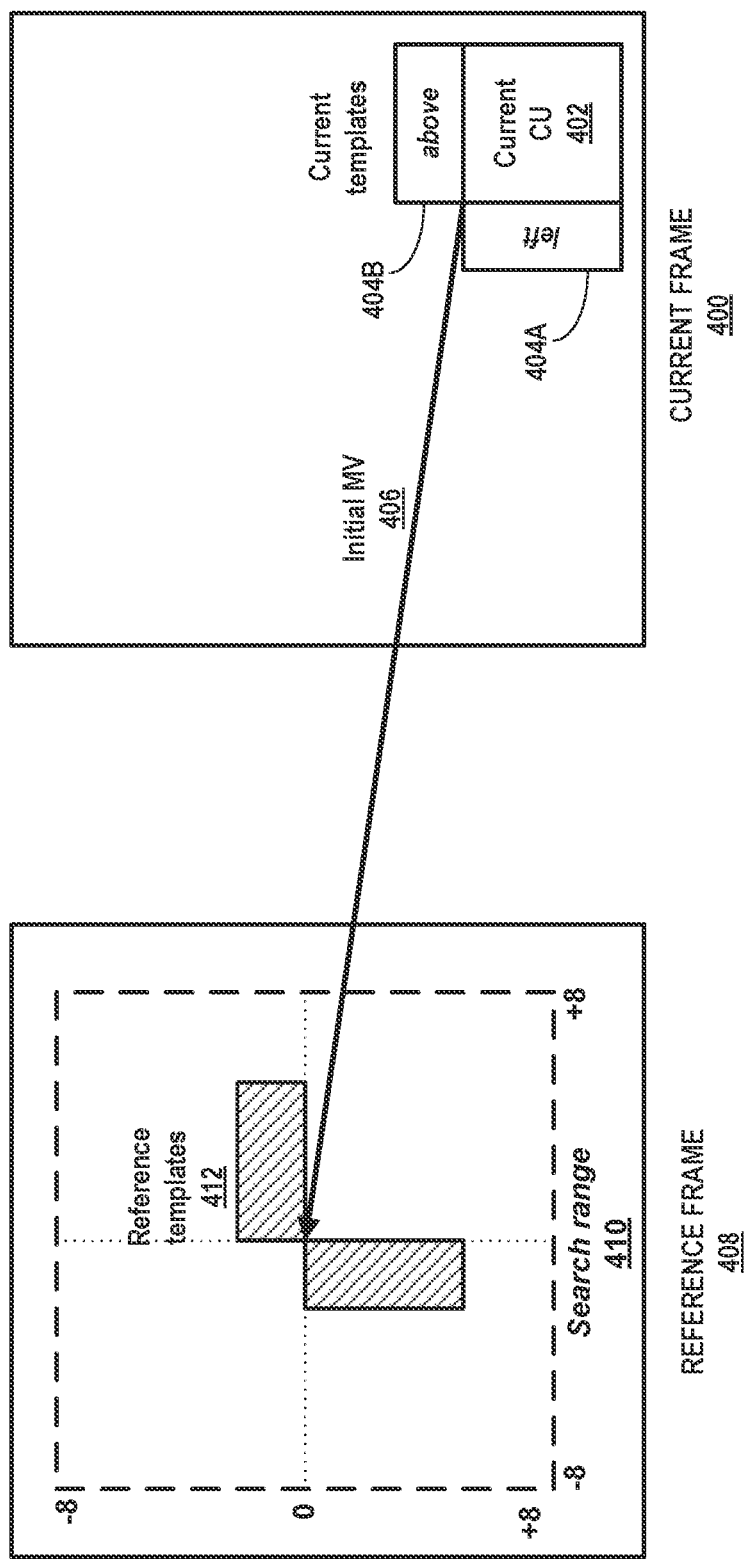
FIG. 4 is a conceptual diagram illustrating template matching on a search area around an initial motion vector.

FIG. 4 is a conceptual diagram illustrating template matching on a search area around an initial motion vector. As illustrated in FIG. 4, a current frame 400 includes a current CU 402. A left current template 404A and an above current template 404B (collectively, "current templates 404") are left and above current CU 402. An initial MV 406 for current CU 402 may be determined. For instance, video encoder 200 may signal information indicating initial MV to video decoder 300. Video encoder 200 or video decoder 300 searches for a better MV around a location indicated by initial MV 406 of current CU 402 within a search range 410 (e.g., a [−8, +8]-pel search range) within a reference frame 408. The template matching method in Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, document JVET-J0021 (hereinafter, "JVET-J0021") is used with the following modifications: search step size is determined based on adaptive motion vector resolution (AMVR) mode and TM can be cascaded with bilateral matching process in merge modes.

In TM-AMVP mode, an MVP candidate is determined based on template matching error to select the MVP candidate which reaches the minimum difference between the current block template and the reference block template 412, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the table below. This search process ensures that the MVP candidate keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR.

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | v | | |

In TM-MRG merge mode, similar search method is applied to the merge candidate indicated by the merge index. As Table 1 shows, TM may perform all the way down to 1/8-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Template matching is applied to geometric partition merge (GPM) mode, called as TM-GPM mode. When GPM is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 2. The motion is then refined by minimizing the difference between the current template and the template in the reference picture using the same search pattern of merge mode with half-pel interpolation filter disabled.

3. Zero MV candidates are padded until the GPM candidate list is full.

Template matching with combined intra/inter prediction (TM-CIIP) is now discussed. In CIIP mode, the prediction samples can be generated by weighting an inter prediction signal predicted using template matching merge candidate and an intra prediction signal. This mode is called TM-CIIP. The TM-CIIP merge candidate list is built for the TM-CIIP mode. The merge candidates are refined by template matching. The CIIP-TM merge candidates are also reordered by the ARMC method as regular merge candidates. The maximum number of TM-CIIP merge candidates is equal to two. When the sequence-level CIIP flag is enabled, a sequence-level flag for TM-CIIP is present in the bitstream to determined whether TM-CIIP can be used at coding-unit level.

Adaptive reordering of merge candidates (ARMC) is now discussed. The merge candidates may be adaptively reordered with template matching (TM). The reordering method is applied to regular merge mode, template matching (TM) merge mode, and affine merge mode (excluding the SbTMVP candidate). For the TM merge mode, merge candidates are reordered before the refinement process. ARMC can be disabled from the reconstruction process by turning off its sequence-level flag.

TABLE 2

Template for the 1st and 2nd geometric partitions, where A represents using above samples,
L represents using left samples, and L + A represents using both left and above samples.

| Partition angle | 0 | 2 | 3 | 4 | 5 | 8 | 11 | 12 | 13 | 14 |
| --- | --- | --- | --- | --- | --- | --- | --- | --- | --- | --- |
| 1st partition | A | A | A | A | L + A | L + A | L + A | L + A | A | A |
| 2nd partition | L + A | L + A | L + A | L | L | L | L | L + A | L + A | L + A |

| Partition angle | 16 | 18 | 19 | 20 | 21 | 24 | 27 | 28 | 29 | 30 |
| --- | --- | --- | --- | --- | --- | --- | --- | --- | --- | --- |
| 1st partition | A | A | A | A | L + A | L + A | L + A | L + A | A | A |
| 2nd partition | L + A | L + A | L + A | L | L | L | L | L + A | L + A | L + A |

A GPM candidate list may be constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered. All the zero candidates from the ARMC reordering process are excluded during the construction of Merge motion vector candidates list.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 5:
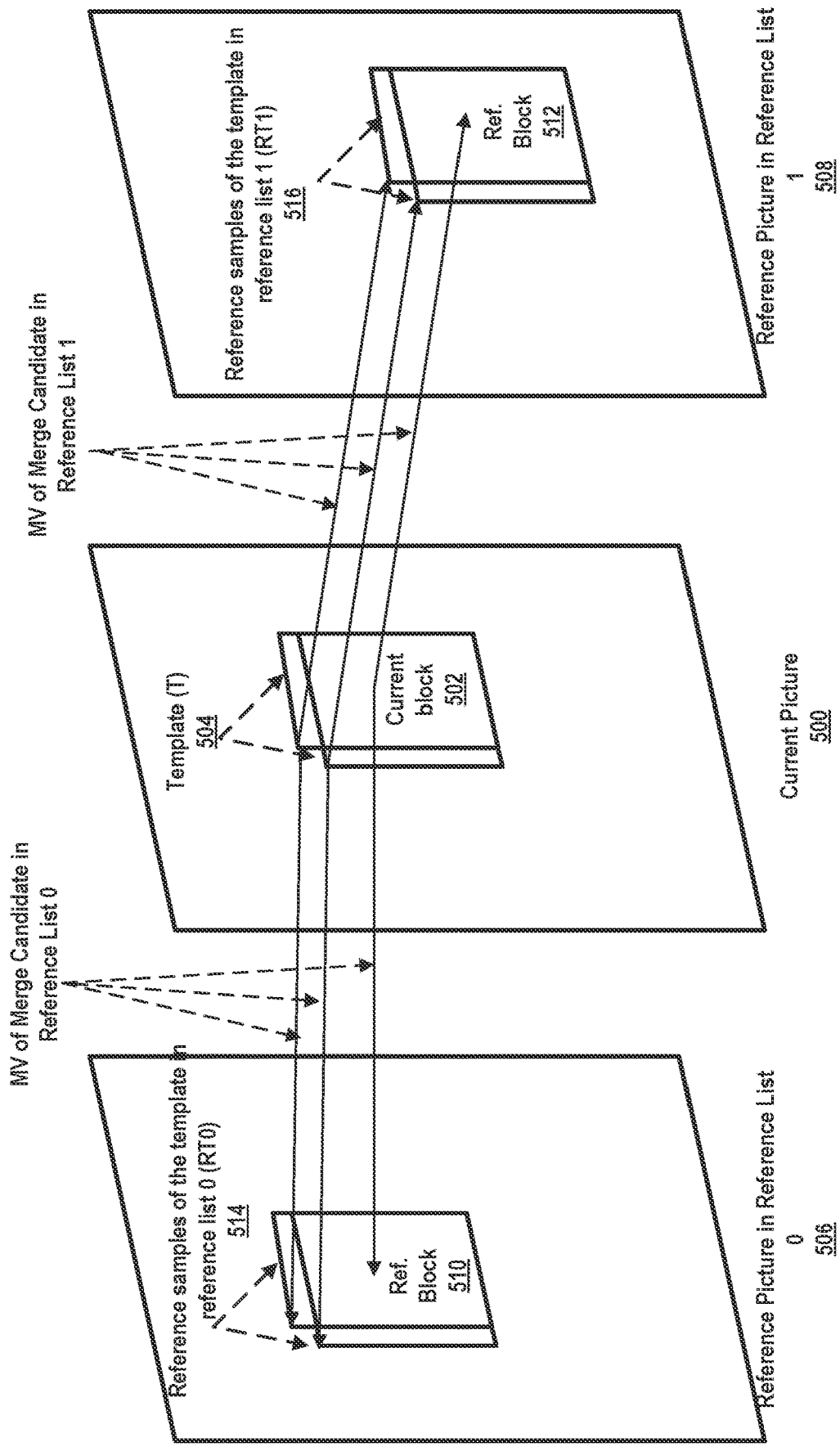
FIG. 5 is a conceptual diagram illustrating template and reference samples of a template in reference pictures.

When a merge candidate utilizes bi-directional prediction, the reference samples of the template of the merge candidate are also generated by bi-prediction as shown in FIG. 5. FIG. 5 is a conceptual diagram illustrating template and reference samples of a template in reference pictures. In the example of FIG. 5, a current picture 500 includes a current block 502. Templates are above and left of current block 502. The merge candidate for current block 502 may include List 0 motion information that identifies a reference picture in reference list 0 (506) and List 1 motion information that identifies a reference picture in reference picture in reference list 1 (508). The List 0 motion information further includes an initial motion vector that indicates a location in reference picture 506. The List 1 motion information further includes an initial motion vector that indicates a location in reference picture 508. Video encoder 200 and video decoder 300 may search areas around the locations identified by the initial motion vectors to identify reference blocks 510 and 512. Video encoder 200 and video decoder 300 may identify reference blocks 510, 512 based on comparisons of samples in template 504 to reference samples in corresponding templates 514, 516 of reference pictures 506, 508.

Figure 6:
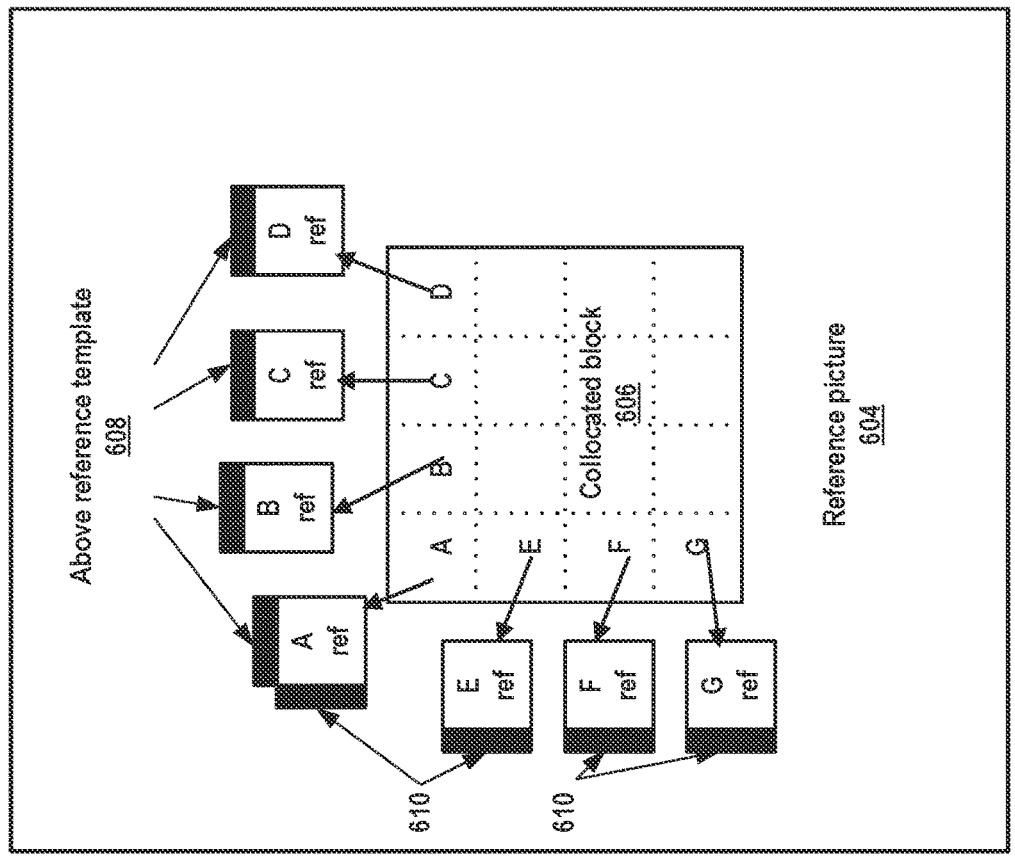
FIG. 6 is a conceptual diagram illustrating template and reference samples of a template of a current block with sub-block motion using the motion information of the sub-blocks of the current block.
Figure 6:
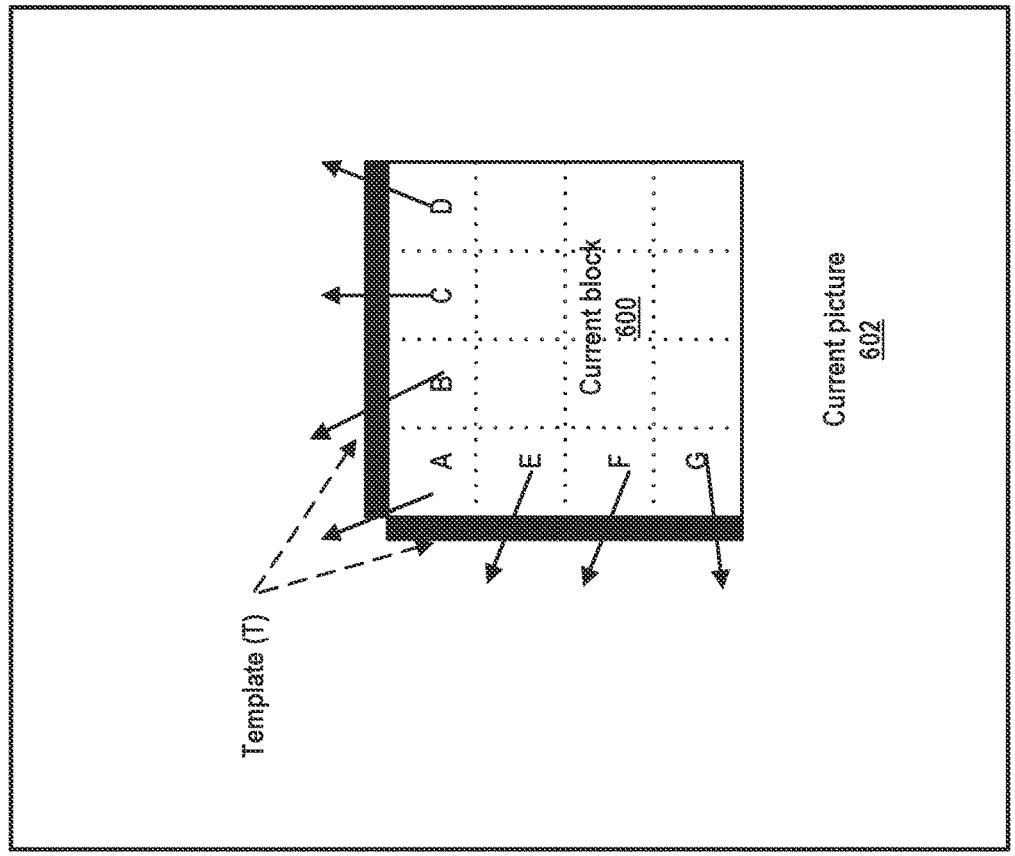

FIG. 6 is a conceptual diagram illustrating template and reference samples of a template of a current block 600 with sub-block motion using the motion information of the sub-blocks of current block 600. A current picture 602 includes current block 600. A collocated picture 604 includes a collocated block 606. For subblock-based merge candidates with subblock size equal to WsubxHsub, the above template comprises several sub-templates 608 with the size of Wsubx1, and the left template comprises several sub-templates 610 with the size of 1xHsub. As shown in FIG. 6, the motion information of the subblocks in the first row and the first column of current block 600 is used to derive the reference samples of each sub-template.

TMVP and non-adjacent merge candidate type reordering is now discussed. Merge candidates of one single candidate type, e.g., TMVP or non-adjacent MVP (NA-MVP), are reordered based on the ARMC TM cost values. The reordered candidates are then added into the merge candidate list. The TMVP candidate type adds more TMVP candidates with more temporal positions and different inter prediction directions to perform the reordering and the selection. Moreover, the NA-MVP candidate type is further extended with more spatially non-adjacent positions. The target reference picture of the TMVP candidate can be selected from any one of reference picture in the list according to scaling factor. The selected reference picture is the one whose scaling factor is the closest to 1.

Geometric partition merge (GPM) split mode reordering is now discussed. In template matching based reordering for GPM split modes, given the motion information of the current GPM block, the respective TM cost values of GPM split modes are computed. Then, all GPM split modes are reordered in ascending ordering based on the TM cost values. Instead of sending GPM split mode, an index using Golomb-Rice code to indicate where the exact GPM split mode is located in the reordering list is signaled.

The reordering method for GPM split modes is a two-step process performed after the respective reference templates of the two GPM partitions in a coding unit are generated, as follows:

extending GPM partition edge into the reference templates of the two GPM partitions, resulting in 64 reference templates and computing the respective TM cost for each of the 64 reference templates;

reordering GPM split modes based on their TM cost values in ascending order and marking the best 32 as available split modes.

Figure 7:
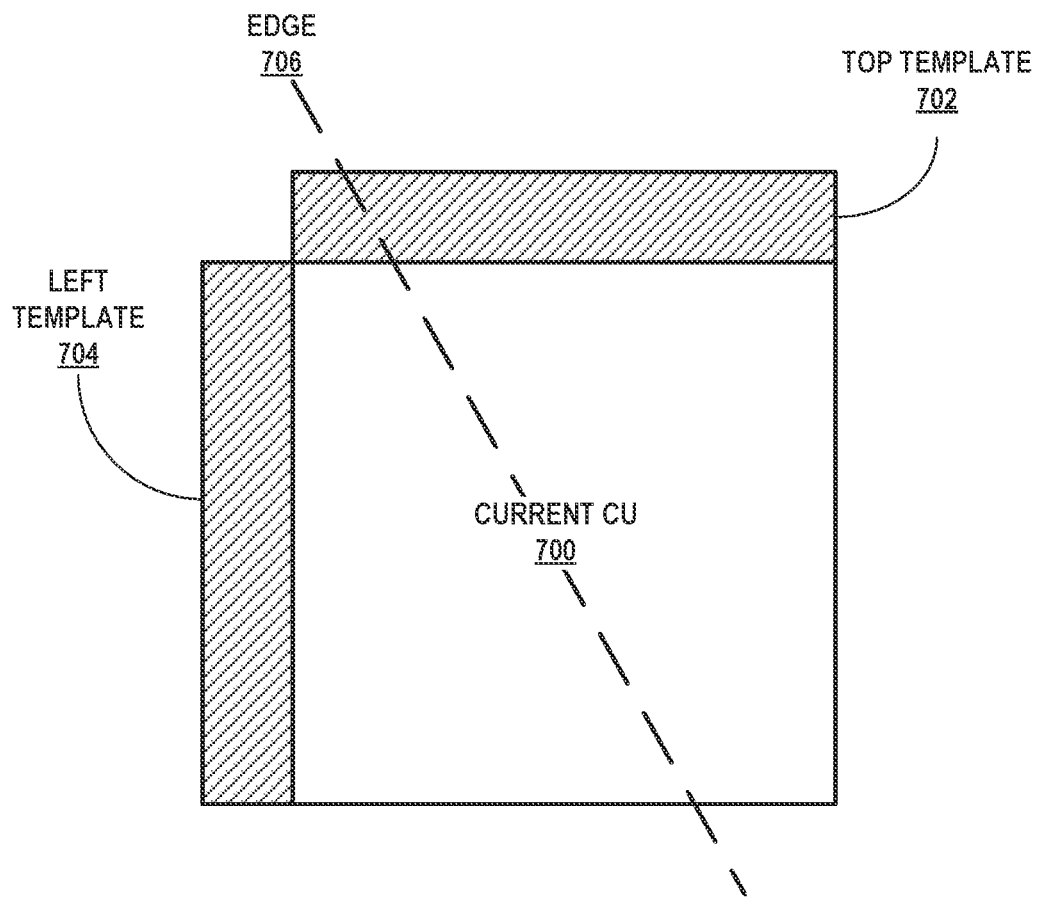
FIG. 7 is a conceptual diagram illustrating an edge on templates.

The edge on the template is extended from that of the current CU, as FIG. 7 illustrates, but GPM blending process is not used in the template area across the edge. FIG. 7 is a conceptual diagram illustrating an edge on templates. Specifically, in the example of FIG. 7, a current CU 700 has a top template 702 and a left template 704. Current CU 700 is partitioned by a GPM partition edge 706. After ascending reordering using TM cost, an index is signaled. The GPM split mode reordering has its own sequence-level flag to control whether reordering is enabled or not. When GPM split mode is disabled, GPM split mode is not reordered for the whole sequence and the syntax that represents GPM split mode falls back to the original design (that is a 6-bit binary code) as VTM.

Figure 8:
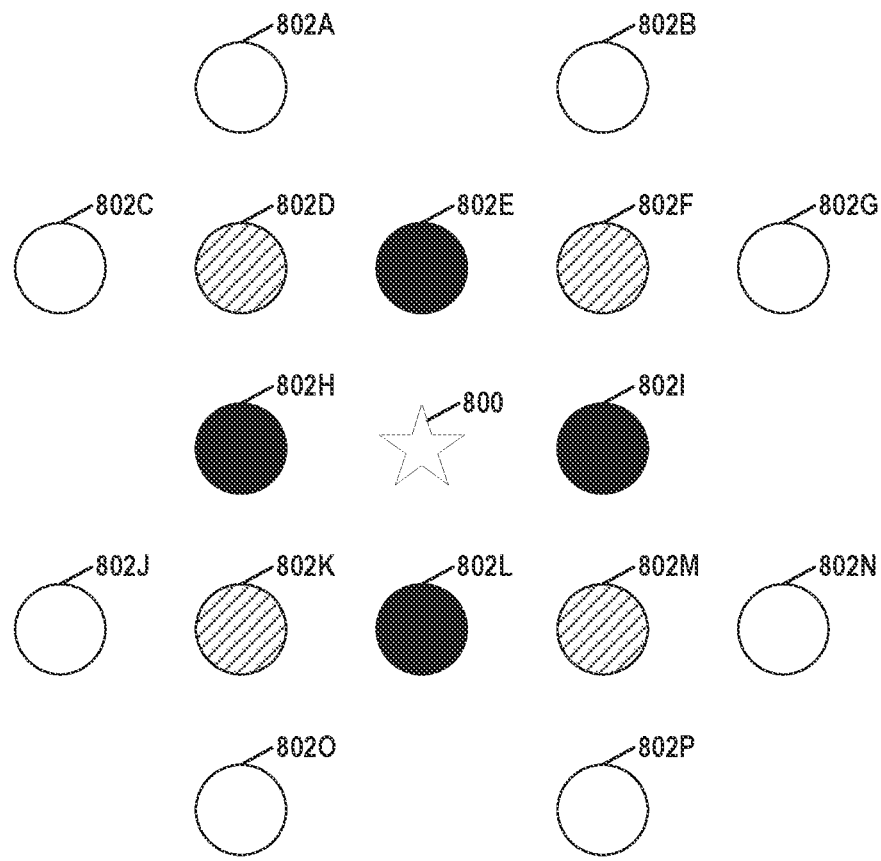
FIG. 8 is a conceptual diagram illustrating additional directions along k×π/8 diagonal angles.

Candidate reordering for regular Merge Mode with Motion Vector Difference (MMVD) and affine MMVD is now discussed. The MMVD offsets are extended for MMVD and affine MMVD modes. Additional refinement positions along $k \times \pi/8$ diagonal angles are added shown in FIG. 8, thus increasing the number of directions from 4 to 16. Second, based on the sum of absolute differences (SAD) cost between the template (one row above and one column left to the current block) and its reference for each refinement position, all the possible MMVD refinement positions (16× 6) for each base candidate are reordered. Finally, the top ⅛ refinement positions with the smallest template SAD costs are kept as available positions, consequently for MMVD index coding. The MMVD index is binarized by the Rice code with the parameter equal to 2. The affine MMVD reordering is extended, in which additional refinement positions along $k \times \pi/4$ diagonal angles are added. After reordering top ½ refinement positions with the smallest template SAD costs are kept. FIG. 8 is a conceptual diagram illustrating additional directions along $k \times \pi/8$ diagonal angles. In FIG. 8, a star symbol 800 represents a location in a reference frame to which a base motion vector of MMVD points. Relative to the position of star symbol 800, the 16 circles (802A-802P) (black, shaded, blank) represent directions toward which the base motion vector can be refined. There are 16 directions that correspond respectively to 16 angles (as denoted as $\{k \times \pi/8, \text{ for all } k \in \{0, 1, \ldots, 15\}\}$). Specifically, they are $\{(\pm 1, 0), (0, \pm 1), (-1, \pm 1), (1, \pm 1), (-1, \pm 2), (1, \pm 2), (-2, \pm 1), (2, \pm 1)\}$ as supported in ECM's MMVD mode. In addition, only the first half of the directions are supported in ECM's affine MMVD. A final motion vector may be a base motion vector plus a difference vector derived by a selected direction vector multiplied by a selected offset scalar.

MVD sign prediction is now discussed. In MVD sign prediction, possible MVD sign combinations are sorted according to the template matching cost and index corresponding to the true MVD sign is derived and context coded. At the decoder side, the MVD signs are derived as following:

1. Parse the magnitude of MVD components.
2. Parse context-coded MVD sign prediction index.
3. Build MV candidates by creating a combination between possible signs and absolute MVD values and adding the combination to the MV predictor.
4. Derive MVD sign prediction cost for each derived MV based on template matching cost and sort.

5. Use MVD sign prediction index to pick the true MVD sign.

MVD sign prediction is applied to inter AMVP, affine AMVP, MMVD and affine MMVD modes. A sequence-level flag is used to determine whether MVD sign prediction is used in the bitstream. When this sequence-level flag is off, the MVD sign bits are signaled in the same way as VTM and are not reordered.

Reference picture reordering is now discussed. A block level reference picture reordering method based on template matching may be used. For the uni-prediction AMVP mode, the reference pictures in List 0 and List 1 are interweaved to generate a joint list. For each hypothesis of the reference picture in the joint list template matching is performed to calculate the cost. The joint list is reordered based on ascending order of the template matching cost. The index of the selected reference picture in the reordered joint list is signaled in the bitstream. For the bi-prediction AMVP mode, a list of pairs of reference pictures from List 0 and List 1 is generated and similarly reordered based on the template matching cost. The index of the selected pair is signaled.

A sequence-level flag is used to determine whether reference picture reordering is used in the bitstream. When this sequence-level flag is off, the reference picture indices are signaled in the same way as VTM and are not reordered.

Template matching with overlapped block motion compensation (TM-OBMC) is now discussed. In a template matching based overlapped block motion compensation (OBMC) scheme, instead of directly using the weighted prediction, the prediction value of CU boundary samples derivation approach is decided according to the template matching costs, including using current block's motion information only, or using neighboring block's motion information as well with one of the blending modes.

Figure 9:
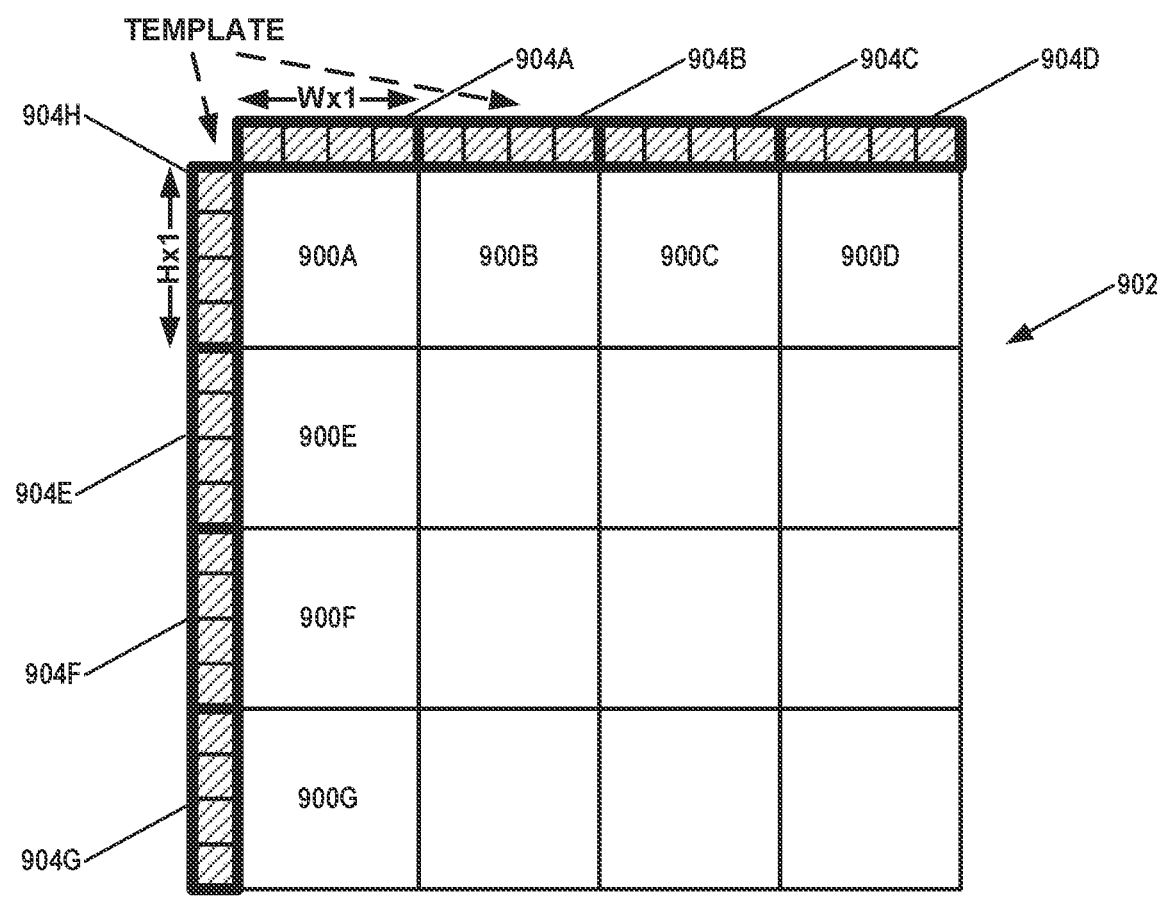
FIG. 9 is a conceptual diagram illustrating an example template for TM-OBMC.

FIG. 9 is a conceptual diagram illustrating example templates for TM-OBMC. In this scheme, for each top block (i.e., each of blocks 900A, 900B, 900C, 900D) with a size of 4×4 at the top boundary of a CU 902, the above template size (e.g., templates 904A, 904B, 904C, 904D) equals to 4×1. If N adjacent blocks have the same motion information, then the above template size is enlarged to 4N×1 since the motion compensation operation can be processed at one time. For each left block (i.e., blocks 900A, 900E, 900F, 900G) with a size of 4×4 at the left CU boundary, the left template (904E, 904F, 904G, 904H size equals to 1×4 or 1×4N (as depicted in FIG. 9).

Specifically, in the example of FIG. 9, for each 4×4 top block (i.e., each of blocks 900A, 900B, 900C, 900D) or other group of N 4×4 blocks, the prediction value of boundary samples is derived following the below steps.

Take block 900A as the current block and its above neighboring block AboveNeighbor_A for example. The operation for left blocks is conducted in the same manner.

First, three template matching costs (Cost1, Cost2, Cost3) are measured by SAD between the reconstructed samples of a template and its corresponding reference samples derived by MC process according to the following three types of motion information:

Cost1 is calculated according to A's motion information.
Cost2 is calculated according to AboveNeighbor_A's motion information.
Cost3 is calculated according to weighted prediction of A's and AboveNeighbor_A's motion information with weighting factors as ¾ and ¼ respectively.

Second, choose one approach to calculate the final prediction results of boundary samples by comparing Cost1, Cost2 and Cost 3.

The original motion compensation result using current block's motion information is denoted as Pixel1, and the motion compensation result using neighboring block's motion information is denoted as Pixel2. The final prediction result is denoted as NewPixel.

If Cost1 is minimum, then NewPixel(i,j)=Pixel1(i,j).
If (Cost2+(Cost2>>2)+(Cost2>>3))<=Cost1, then blending mode 1 is used.
For luma blocks, the number of blending pixel rows is 4.

NewPixel($i$,0)=(26×Pixel1($i$,0)+6×Pixel2($i$,0)+16)>>5

NewPixel($i$,1)=(7×Pixel1($i$,1)+Pixel2($i$,1)+4)>>3

NewPixel($i$,2)=(15×Pixel1($i$,2)+Pixel2($i$,2)+8)>>4

NewPixel($i$,3)=(31×Pixel1($i$,3)+Pixel2($i$,3)+16)>>5

For chroma blocks, the number of blending pixel rows is 1.

NewPixel($i$,0)=(26×Pixel1($i$,0)+6×Pixel2($i$,0)+16)>>5

If Cost1<=Cost2, then blending mode 2 is used.
For luma blocks, the number of blending pixel rows is 2.

NewPixel($i$,0)=(15×Pixel1($i$,0)+Pixel2($i$,0)+8)>>4

NewPixel($i$,1)=(31×Pixel1($i$,1)+Pixel2($i$,1)+16)>>5

For chroma blocks, the number of blending pixel rows/columns is 1.

NewPixel($i$,0)=(15×Pixel1($i$,0)+Pixel2($i$,0)+8)>>4

Otherwise, blending mode 3 is used.
For luma blocks, the number of blending pixel rows is 4.

NewPixel($i$,1)=(7×Pixel1($i$,1)+Pixel2($i$,1)+4)>>3

NewPixel($i$,2)=(15×Pixel1($i$,2)+Pixel2($i$,2)+8)>>4

NewPixel($i$,3)=(31×Pixel1($i$,3)+Pixel2($i$,3)+16)>>5

For chroma blocks, the number of blending pixel rows is 1.

NewPixel($i$,0)=(7×Pixel1($i$,0)+Pixel2($i$,0)+4)>>3

Intra template matching prediction (IntraTMP) is now described. IntraTMP is a special intra prediction mode that copies the best prediction block from the reconstructed part of the current frame, whose L-shaped template matches the current template. For a predefined search range, the encoder searches for the most similar template to the current template in a reconstructed part of the current frame and uses the corresponding block as a prediction block. Video encoder 200 then signals the usage of this mode, and the same prediction operation is performed at the decoder side.

Figure 10:
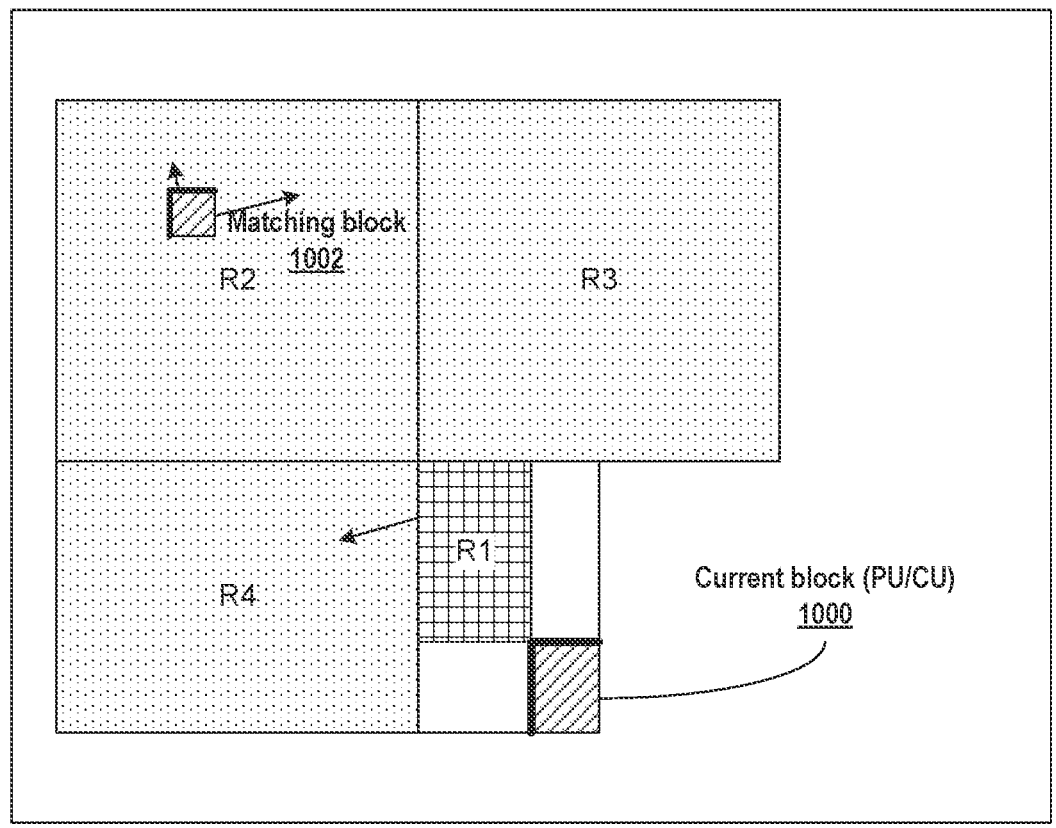
FIG. 10 is a conceptual diagram illustrating an example intra template matching search area.

FIG. 10 is a conceptual diagram illustrating an example intra template matching search area. SAD is used as a cost function. The prediction signal is generated by matching the L-shaped causal neighbor of a current block 1000 with another block in a predefined search area in FIG. 10 consisting of:

R1: current CTU
R2: top-left CTU
R3: above CTU
R4: left CTU

Within each of regions R1, R2, R3, and R4, video decoder 300 searches for a reference template that has least SAD with respect to the template of current block 1000 and uses a block (e.g., matching block 1002) corresponding to the reference template as a prediction block.

The dimensions of all regions (SearchRange_w, SearchRange_h) are set proportional to the block dimension (BlkW, BlkH) to have a fixed number of SAD comparisons per pixel. That is:

SearchRange_$w$=5*Blk$W$

SearchRange_$h$=5*Blk$H$

The Intra template matching tool is enabled for CUs with size less than or equal to 64 in width and height. This maximum CU size for Intra template matching may be configurable. The Intra template matching prediction mode may be signaled at a CU level through a dedicated flag when decoder-side intra mode derivation (DIMD) is not used for current CU.

Intra Block Copy (IBC) with TM-AMVP (IBC-TM-AMVP) and IBC with TM-MRG (IBC-TM-MRG) is now discussed. Template Matching is used in IBC for both IBC merge mode and IBC AMVP mode, called respectively as IBC-TM-AMVP and IBC-TM-MRG.

In IBC-TM-MRG, the merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU. In addition, the selected candidates are refined with the Template Matching method prior to the RDO or decoding process. The IBC-TM-MRG mode has been put in competition with the regular IBC merge mode and a TM-merge flag is signaled.

In the IBC-TM-AMVP mode, up to 3 candidates are selected from the IBC-TM-MRG merge list. Each of those 3 selected candidates are refined using the Template Matching method and sorted according to their resulting Template Matching cost. Only the 2 first ones are then considered in the motion estimation process.

Figure 11:
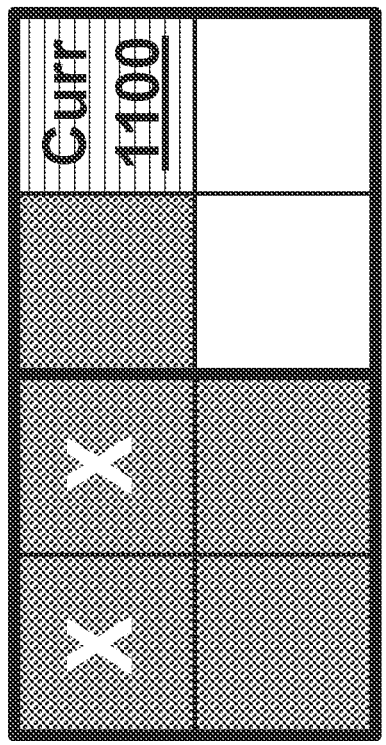
FIG. 11 is a conceptual diagram illustrating intra block copy reference region depending on a current coding unit (CU) position.
Figure 11:
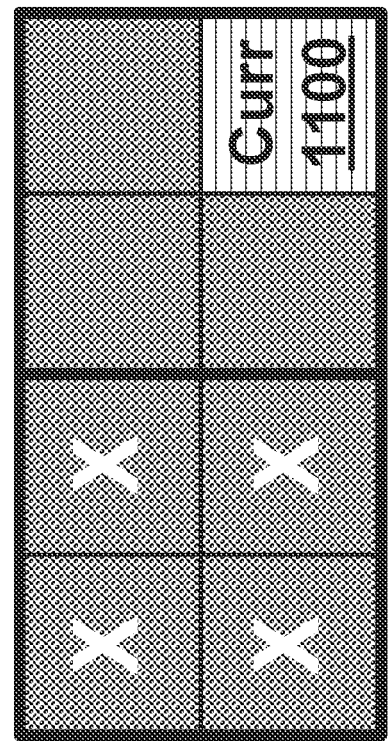
Figure 11:
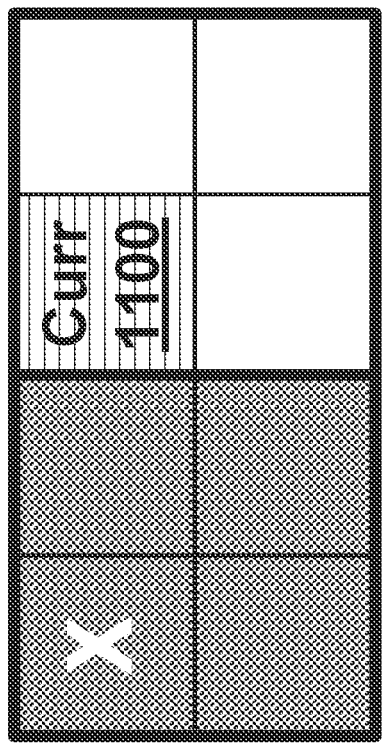
Figure 11:
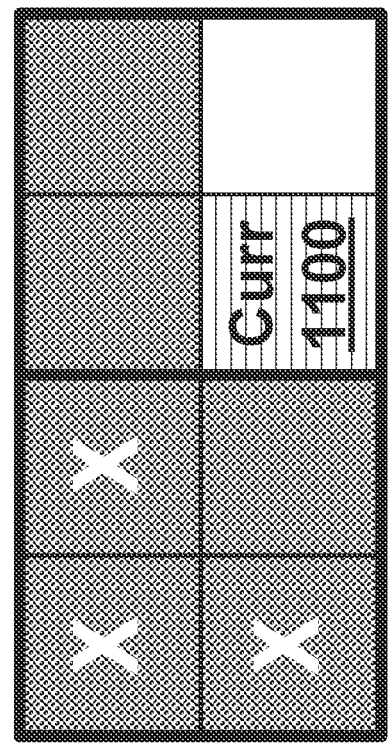

FIG. 11 is a conceptual diagram illustrating intra block copy reference region depending on a current coding CU position. The Template Matching refinement for both IBC-TM merge and AMVP modes is quite simple since IBC motion vectors are constrained (i) to be integer and (ii) within a reference region as shown in FIG. 11. Specifically, in the example of FIG. 11, each small square correspond to a CU. The squares with darker borders surrounding groups of four CUs may correspond to CTUs. In some examples, each of the CTUs may be of size 128×128 while each of the CUs may have sizes of 64×64. Furthermore, FIG. 11 show a current CU 1100 at different locations within a CTU. Shaded CUs are causal for current CU 1100. Different CUs are available for IBC depending on the position of current CU 1100. In FIG. 11, CUs marked with "X" are unavailable for IBC.

In IBC-TM-MRG mode, all refinements are performed at integer precision, and in IBC-TM-AMVP mode, refinements are performed either at integer precision or 4-pel precision depending on the AMVR value. Such a refinement accesses only to samples without interpolation. In both cases, the refined motion vectors and the used template in each refinement step must respect the constraint of the reference region.

In the on-going development of ECM common testing software platform, template matching prediction and related coding tools that work relying on template matching prediction are almost everywhere. Not every one of the coding tools has systematic design at high-level syntax to switch template matching prediction and related coding tools on and off. Some of the coding tools may leave the codec with an undefined behavior when a certain template matching related tool is disabled from the bitstream.

If not otherwise stated, a coding tool referred hereafter to as a "TM tool" is a tool from, but not limited to, the template matching related coding tools (e.g., TM-AMVP, TM-MRG, . . . ) as described in the sections of this disclosure related to TM-AMVP and TM-MRG, TM-GPM, TM-CIIP, ARMC, TMCP and non-adjacent merge candidate type reordering, GPM split mode reordering, candidate reordering for regular MMVD and affine MMVD, MVD sign prediction, reference picture reordering, TM-OBMC, IntraTMP, IBC-TM-AMVP, and IBC-TM-MRG.

High-level flag control for TM tools is now discussed. In accordance with an example of this disclosure, each TM tool (e.g., TM-Template Matching Advanced Motion Vector Prediction (TM-AMVP) and Template Matching Merge (TM-MRG), TM-GPM, TM-CIIP, ARMC, TMCP and non-adjacent merge candidate type reordering, GPM split mode reordering, Candidate reordering for regular MMVD and affine MMVD, MVD sign prediction, reference picture reordering, TM-OBMC, IntraTMP, IBC-TM-AMVP, and IBC-TM-MRG as described elsewhere in this disclosure) may has its own sequence-, picture-, subpicture-, slice- and/or tile-level flag to determine whether the respective syntax and decoding/reconstruction processes are applied. When the respective flag indicates a TM tool is not applied, video decoder 300 may either turn off the TM tool or rollback to the original syntax/decoding/reconstruction design, depending on which TM tool is used.

Some TM tools modified the original codec design, and thus rollback may be required when respective flags are off.

TM-AMVP: Roll back to VTM that signals AMVP flag and template matching.

GPM split mode reordering: Roll back to VTM which signals GPM split mode using binary code without context coding.

Candidate reordering for regular MMVD and affine MMVD: Roll back to direction index coding and offset index coding to represent the motion of a merge candidate.

MVD sign prediction: Roll back to VTM to separate the coding for the sign bits of x- and y-components of a motion vector difference vector.

Reference picture reordering: Roll back to VTM to signal reference index separately for each reference picture list.

Other TM tools may be new coding feature, and thus can be turned off (i.e., related syntax element no longer present in the bitstream and corresponding decoding process bypassed) when respective flags are off.

TM-MRG
TM-GPM
TM-CIIP
ARMC
TMVP and Non-adjacent merge candidate type reordering
TM-OBMC
IntraTMP
IBC-TM-AMVP
IBC-TM-MRG In some examples, some TM tools that have similar functionalities can share the same high-level flags to enable or disable them altogether.

In some examples, TM-AMVP and IBC-TM-AMVP are both AMVP-related tools and can share the same high-level flags for switching them on and off altogether. In other words, a single high-level flag may switch both TM-AMVP and IBC-TM-AMVP on and off.

In some examples, TM-MRG and IBC-TM-MRG are both block-based merge mode and can share the same high-level flags for switching them on and off altogether.

In some examples, GPM split mode reordering, candidate reordering for regular MMVD and affine MMVD, MVD sign prediction, reference picture reordering, ARMC, TMVP and non-adjacent merge candidate type reordering are TM-based ordering methods and can share the same high-level flags for switching them on and off altogether. In addition, MVD sign prediction may not be included because its template shape may not be aligned with other TM tools aforementioned in this example.

In some examples, some TM tools may have dependency that requires certain functionalities from another TM tool. For example, many tools rely on the same template samples as ARMC to compute TM cost for reordering. Their high-level flags are supposed to be present in bitstream only when ARMC's high level flag is enabled. It is noted that when a high-level flag of a TM tool is not present in bitstream, the corresponding TM tool is disabled.

In some examples, a high-level flag of IBC-TM-AMVP is present only when the high-level flag of TM-AMVP at the same hierarchy (e.g., sequence-, picture-, subpicture-, slice- and/or tile-level) is enabled.

In some examples, a high-level flag of IBC-TM-MRG is present only when the high-level flag of TM-MRG at the same hierarchy (e.g., sequence-, picture-, subpicture-, slice- and/or tile-level) is enabled.

In some examples, a high-level flag of TM-CIIP is present only when CIIP is enabled and the high-level flag of TM-MRG at the same hierarchy (e.g., sequence-, picture-, subpicture-, slice- and/or tile-level) is enabled.

In some examples, a high-level flag of N is present only when the high-level flag of ARMC at the same hierarchy (e.g., sequence-, picture-, subpicture-, slice- and/or tile-level) is enabled, where N can be, but not limited to, GPM split mode reordering, candidate reordering for regular MMVD and affine MMVD, MVD sign prediction, reference picture reordering, TMVP and non-adjacent merge candidate type reordering.

In some examples, TM tools may be characterized with different levels of decoding complexity and thus can be controlled on and off together to offer configurable coding tool set in restricted decoding environments. Typically, there are two types of MV refinement that template matching adopts: (1) searching around a given initial motion vector to reduce TM cost and (2) searching within a list of motion vector candidates to find one that reaches lowest TM cost. Two flags at each of the coding hierarchy (e.g., sequence-, picture-, subpicture-, slice- and/or tile-level) may be present in the bitstream to enable and disable TM tools.

The first flag may enable or disable the coding tools listed below:
TM-AMVP
TM-MRG
TM-GPM
TM-CIIP
IntraTMP
IBC-TM-AMVP
IBC-TM-MRG The second flag may enable or disable the coding tools listed below:
ARMC
TMVP and non-adjacent merge candidate type reordering
GPM split mode reordering
Candidate reordering for regular MMVD and affine MMVD
MVD sign prediction
Reference picture reordering
TM-OBMC In some examples, IntraTMP may not be included from the control of the first flag. In some examples, IntraTMP, IBC-TM-AMVP and IBC-TM-MRG are not included in the list of coding tools controlled by the first flag because IntraTMP, IBC-TM-AMVP and IBC-TM-MRG are intra coding tools.

In some examples, a high-level flag (e.g., at sequence-, picture-, subpicture-, slice- and/or tile-level) may be signaled before those of TM tools to indicate whether TM tools are used. When this flag is on, the high-level flags of TM tools follow in the parsing order after this newly introduced high-level flag; otherwise, when this flag is off, all the high-level flag of TM tools are not present in the bitstream and their flag values are set as off.

In some examples, IntraTMP may not be included from the control of this new flag. In some examples, IntraTMP, IBC-TM-AMVP and IBC-TM-MRG may not be included from the control of this new flag. In some examples, this new flag, when enabled, also indicates whether the high-level flags of bilateral-matching based methods (e.g., DMVR and multi-pass DMVR) are present in the bitstream.

Thus, in some examples, video encoder 200 may signal a syntax element in the bitstream. The second syntax element may be a sequence-level syntax element, a picture-level syntax element, a slice-level syntax element, or a tile-level syntax element. The second syntax element may indicate whether the bitstream includes one or more template-matching tool syntax elements. Based on the syntax element, video encoder 200 may signal one or more syntax elements in the bitstream indicating whether one or more template-matching tools are enabled. In some such examples, presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the syntax element. Similarly, video decoder 300 may obtain a syntax element from the bitstream, wherein the second syntax element is a sequence-level syntax element, a picture-level syntax element, a slice-level syntax element, or a tile-level syntax element. Video decoder 300 may determine, based on the syntax element, whether the bitstream includes one or more syntax elements (i.e., template-matching tool syntax elements) indicating whether one or more template-matching tools are enabled. In some such examples, presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the syntax element.

In another example, when a high-level flag of IBC-TM-MRG is disabled in the bitstream, the pruning threshold used to determine whether the same motion vector component (that is either x or y direction) of two motion vectors are similar is set equal to N (where N is a positive integer). When the absolute difference a MV component between two MVs is less than N, it means the MV motion component of two MVs are similar. If each MV component of the two MVs are similar, video encoder 200 and video decoder 300 may prune one of the MVs in the construction process of IBC merge candidate list. Typically, N is set equal to either 1 (which means two MVs are regarded as similar when they are exactly identical to each other) or 0 (which means similarity-based pruning is disabled).

In another example, the same notion can be applied to IBC-TM-AMVP. When a high-level flag of IBC-TM-AMVP is disabled in the bitstream, if each MV component of two MVs is similar, video encoder 200 and video decoder 300 may prune one of the MVs in the construction process of IBC AMVP candidate list. Typically, N is set equal to either 1 or 0.

Thus, in some examples, based on the syntax element indicating intra-block copy template matching merge mode (IBC-TM-MRG) or intra-block copy template matching advance motion vector prediction (IBC-TM-AMVP) is disabled, video encoder 200 may set a pruning threshold to a value. Video encoder 200 may prune a first candidate from a list based on a difference between a motion vector component of the first candidate and a motion vector component of a second candidate in the list being less than the pruning threshold. Video encoder 200 may apply the template-matching tool to generate the prediction block for the current CU comprises applying the template-matching tool to generate the prediction block for the current CU based on a candidate in the list. Similarly, based on a syntax element indicating intra-block copy template matching merge mode (IBC-TM-MRG) or intra-block copy template matching advance motion vector prediction (IBC-TM-AMVP) is disabled, video decoder 300 may set a pruning threshold to a value. Video decoder 300 may prune a first candidate from a list based on a difference between a motion vector component of the first candidate and a motion vector component of a second candidate in the list being less than the pruning threshold. Video decoder 300 may apply the template-matching tool to generate the prediction block for the current CU comprises applying the template-matching tool to generate the prediction block for the current CU based on a candidate in the list.

Figure 12:
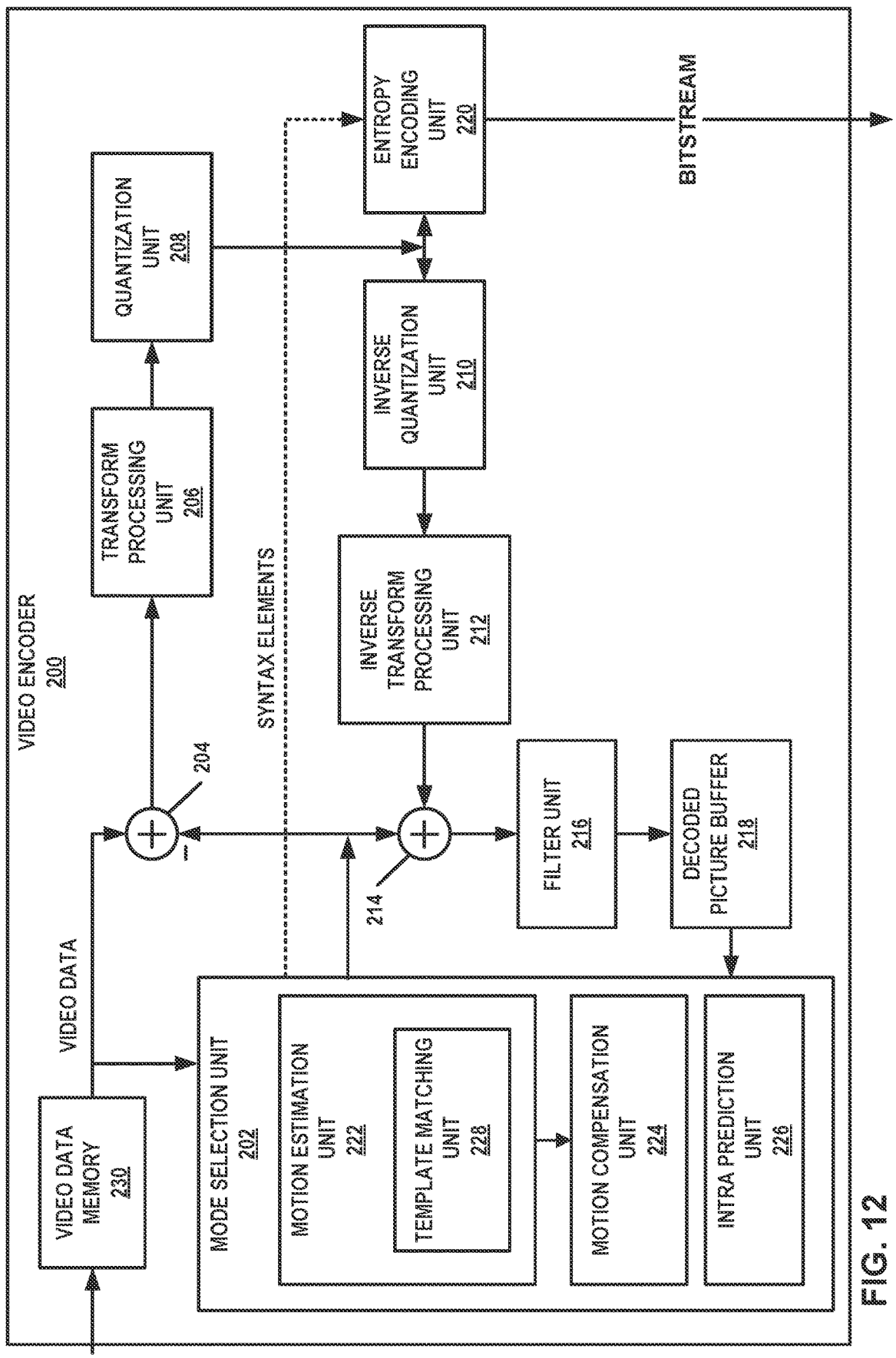
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. In the example of FIG. 12, motion estimation unit 222 includes a template matching unit 228 may implement template-matching coding tools, such as TM-AMVP, GPM split mode reordering, candidate reordering for regular MMVD and affine MMVD, MVD sign prediction, reference picture reordering, template-matching merge mode, template-matching GPM, template-matching CIIP, adaptive re-ordering of merge candidates, TMVP and non-adjacent merge candidate type reordering, TM-OBMC, IntraTMP, IBC-TM-AMVP, and IBC-TM-AMVP. In accordance with techniques of this disclosure, motion estimation unit 222 may signal one or more syntax elements to indicate whether one or more of the template-matching tools are enabled.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra prediction unit 226 may generate the prediction block from samples neighboring the current block. For example, for directional modes, intra prediction unit 226 may generally mathematically combine values of neighboring samples and populate these calculated values in the defined direction across the current block to produce the prediction block. As another example, for DC mode, intra prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processors implemented in circuitry and configured to signal a syntax element in a bitstream that includes an encoded representation of the video data, a syntax element. The syntax element may be a sequence-level syntax element, a picture-level syntax element, a slice-level syntax element, or a tile-level syntax element. The syntax element indicates whether a template-matching tool is enabled. Furthermore, the one or more processors may be configured to, based on the template-matching tool being enabled, apply the template-matching tool to generate a prediction block for a current CU of the video data. The one or more processors may encode the current CU based on the prediction block for the current CU.

Figure 13:
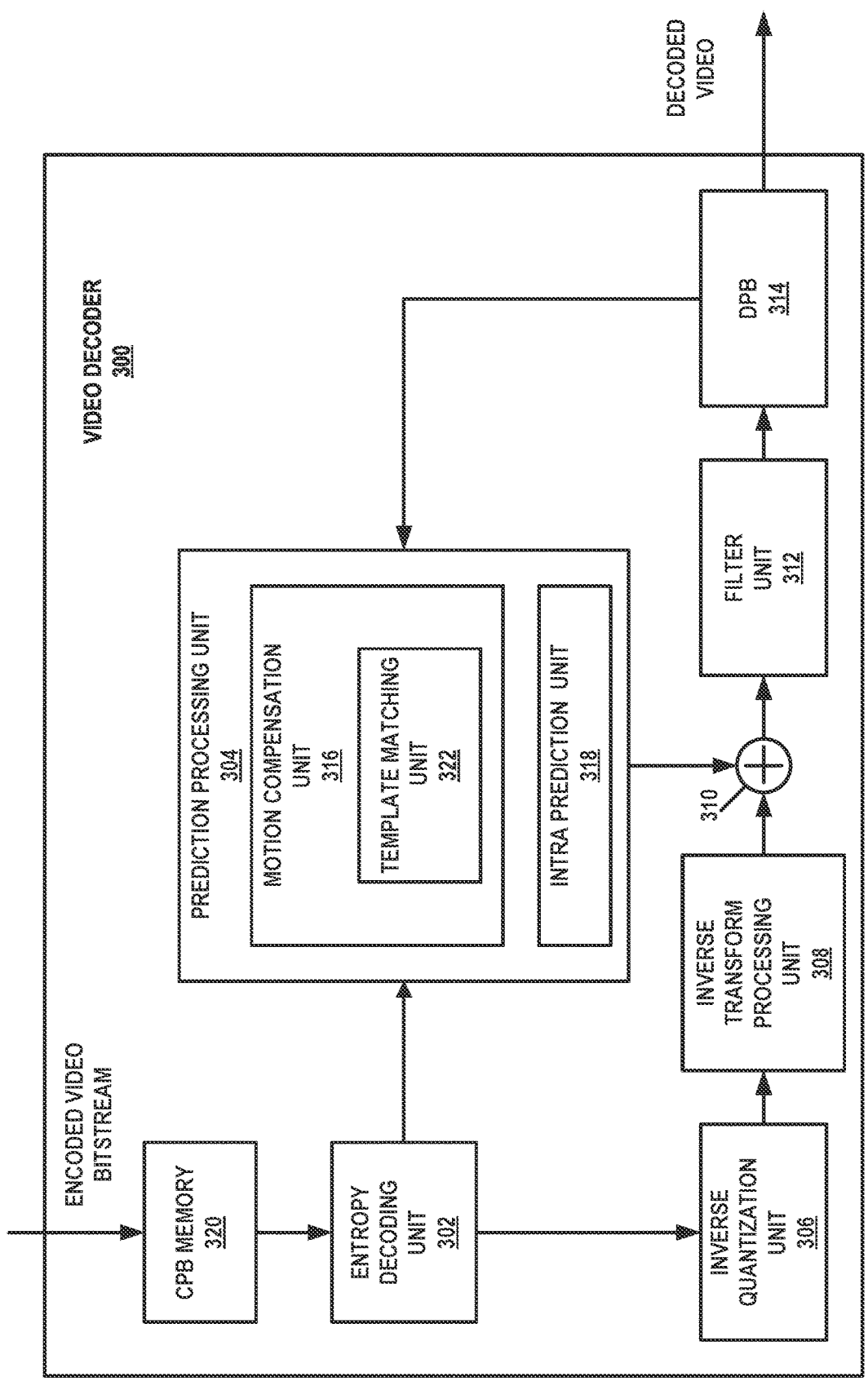
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

In the example of FIG. 13, motion compensation unit 316 includes a template matching unit 322 that implements template-matching coding tools, such as TM-AMVP, GPM split mode reordering, candidate reordering for regular MMVD and affine MMVD, MVD sign prediction, reference picture reordering, template-matching merge mode, template-matching GPM, template-matching CIIP, adaptive reordering of merge candidates, TMVP and non-adjacent merge candidate type reordering, TM-OBMC, IntraTMP, IBC-TM-AMVP, and IBC-TM-AMVP. In accordance with techniques of this disclosure, template matching unit 322 may obtain a syntax element from a bitstream. Template matching unit 322 may determine, based on the syntax element, that a template-matching tool is enabled, apply the template-matching tool to generate a prediction block for a current CU.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra prediction unit 318 may generate the prediction block according to an intra-prediction mode indicated by the prediction information syntax elements. Again, intra prediction unit 318 may generally perform the intra-prediction process in a manner that is substantially similar to that described with respect to intra prediction unit 226 (FIG. 12). Intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to obtain a syntax element from a bitstream that includes an encoded representation of the video data. The syntax element may be a sequence-level syntax element, a picture-level syntax element, a slice-level syntax element, or a tile-level syntax element. The one or more processors may determine, based on the syntax element, whether a template-matching tool is enabled. Based on the template-matching tool being enabled, the one or more processors may apply the template-matching tool to generate a prediction block for a current CU of the video data. The one or more processors may reconstruct the current CU based on the prediction block for the current CU.

Figure 14:
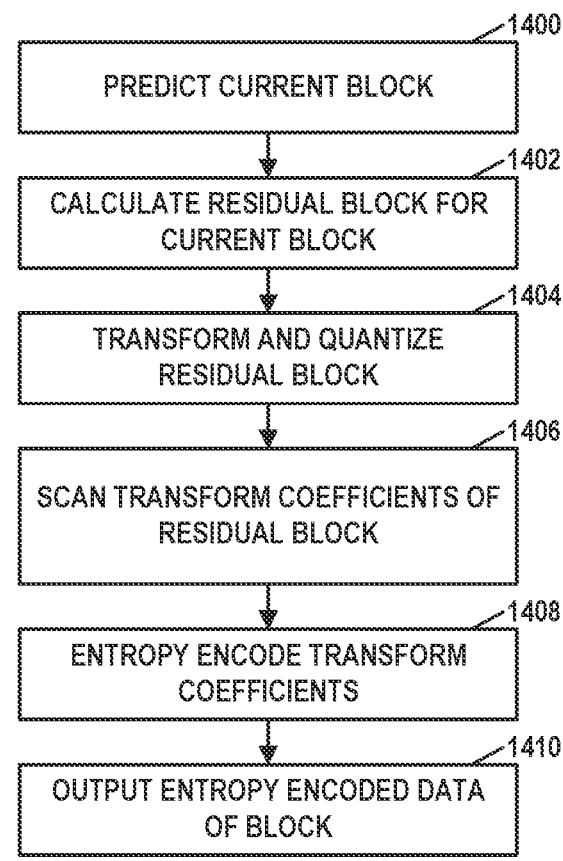
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may comprise a current CU. Although described with respect to video encoder 200 (FIGS. 1 and 12), it should be understood that other devices may be configured to perform a method similar to that of FIG. 14.

In this example, video encoder 200 initially predicts the current block (1400). For example, video encoder 200 may form a prediction block for the current block. In some examples, video encoder 200 (e.g., template matching unit 228 of video encoder 200) may form the prediction block using a template-matching coding tool. Video encoder 200 may signal one or more high-level syntax elements to indicate which, if any, template-matching coding tools are enabled.

Video encoder 200 may calculate a residual block for the current block (1402). To calculate the residual block, video encoder 200 may calculate a difference between the original, unencoded block and the prediction block for the current block. Video encoder 200 may then transform the residual block and quantize transform coefficients of the residual block (1404). Next, video encoder 200 may scan the quantized transform coefficients of the residual block (1406). During the scan, or following the scan, video encoder 200 may entropy encode the transform coefficients (1408). For example, video encoder 200 may encode the transform coefficients using CAVLC or CABAC. Video encoder 200 may then output the entropy encoded data of the block (1410).

Figure 15:
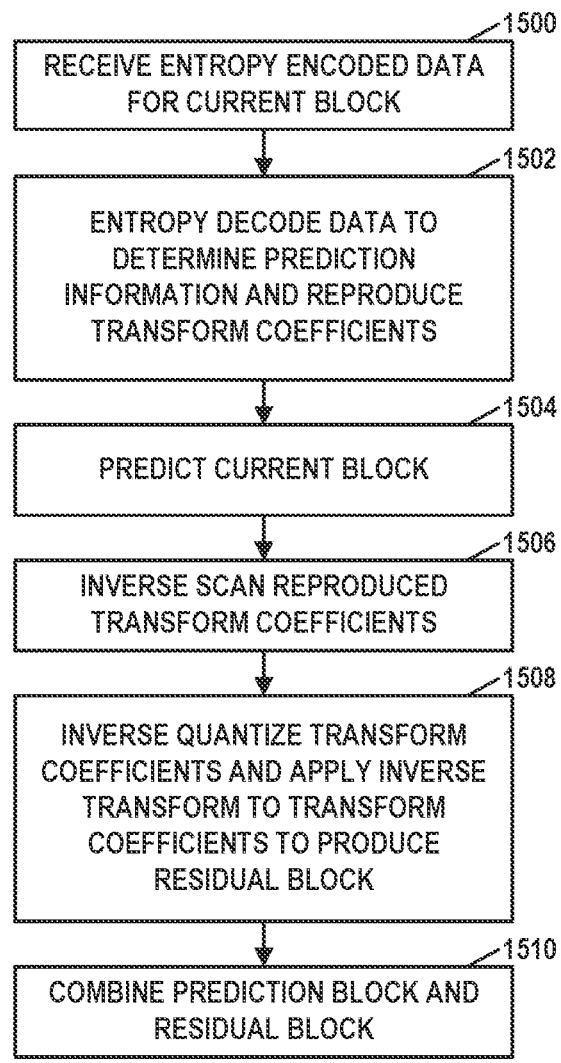
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may comprise a current CU. Although described with respect to video decoder 300 (FIGS. 1 and 13), it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (1500). Video decoder 300 may entropy decode the entropy encoded data to determine prediction information for the current block and to reproduce transform coefficients of the residual block (1502).

Video decoder 300 may predict the current block (1504), e.g., using an intra- or inter-prediction mode as indicated by the prediction information for the current block, to calculate a prediction block for the current block. In some examples, the syntax elements may include a high-level syntax element that indicates whether one or more template-matching coding tools are enabled. Based at least in part on determining that a template-matching coding tool is enabled, template matching unit 322 may apply the template-matching coding tool to generate a prediction block for the current block. Video decoder 300 may inverse scan the reproduced transform coefficients (1506), to create a block of quantized transform coefficients. Video decoder 300 may then inverse quantize the transform coefficients and apply an inverse transform to the transform coefficients to produce a residual block (1508). Video decoder 300 may ultimately decode the current block by combining the prediction block and the residual block (1510).

Figure 16:
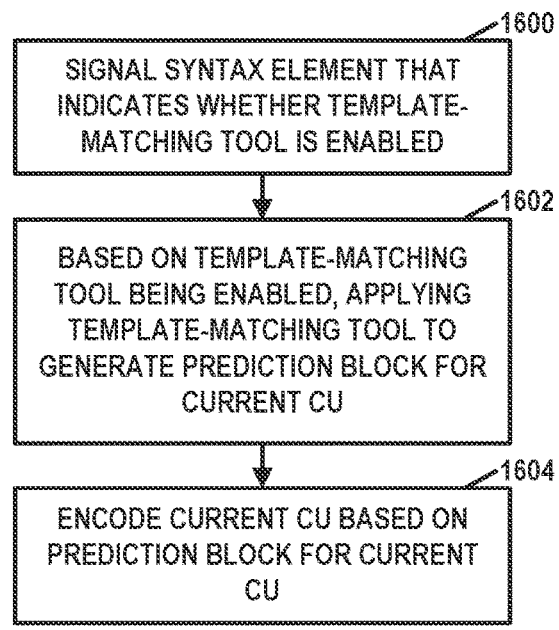
FIG. 16 is a flowchart illustrating an example operation of a video encoder in accordance with the techniques of this disclosure.

FIG. 16 is a flowchart illustrating an example operation of video encoder 200 in accordance with the techniques of this disclosure. In the example of FIG. 16, video encoder 200 may signal, in a bitstream that includes an encoded representation of the video data, a syntax element that indicates whether a template-matching tool is enabled (1600). The template-matching tool may be one of: TM-AMVP, GPM split mode reordering, candidate reordering for regular MMVD and affine MMVD, MVD sign prediction, reference picture reordering, template-matching merge mode, template-matching GPM, template-matching CIIP, adaptive reordering of merge candidates, TMVP and non-adjacent merge candidate type reordering, TM-OBMC, IntraTMP, IBC-TM-AMVP, or IBC-TM-AMVP.

Based on the template-matching tool being enabled, template matching unit 228 of video encoder 200 may apply the template-matching tool to generate a prediction block for a current CU of the video data (1602). Template matching unit 228 may generate the prediction block using the template-matching tool as described elsewhere in this disclosure.

Video encoder 200 may encode the current CU based on the prediction block for the current CU (1604). For example, residual generation unit 204 may generate residual data based on the prediction block and original samples of the current CU. Transform processing unit 206 may apply one or more transforms to the residual data to generate one or more transform blocks. Quantization unit 208 may quantize transform coefficients of the one or more transform blocks. Entropy encoding unit 220 may apply entropy encoding to syntax elements representing the quantized transform coefficients.

In some examples, the template-matching tool is a first template-matching tool, the syntax element is a first syntax element, and video encoder 200 may signal a second syntax element that indicates that indicates whether a second template-matching tool is enabled. If so, template matching unit 228 may use the second template-matching tool for generating a prediction block for a different CU. For example, the first template-matching tool may be template-matching merge mode and the second template-matching tool is template-matching CIIP mode. In other example, the first template-matching tool is ARMC and the second template-matching tool is one of: GPM split mode reordering, candidate reordering for regular MMVD and affine MMVD, MVD sign prediction, reference picture reordering, TMVP, or non-adjacent merge candidate type reordering.

Figure 17:
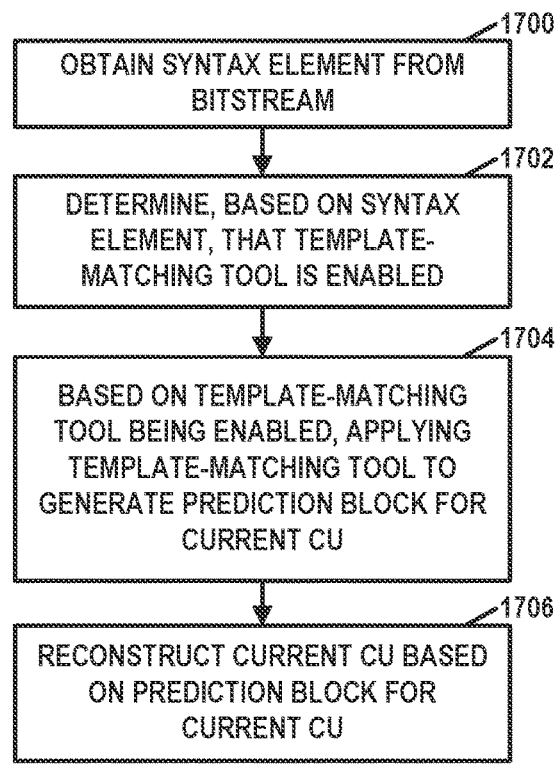
FIG. 17 is a flowchart illustrating an example operation of a video decoder in accordance with the techniques of this disclosure.

FIG. 17 is a flowchart illustrating an example operation of video decoder 300 in accordance with the techniques of this disclosure. In the example of FIG. 17, video decoder 300 may obtain a syntax element from a bitstream that includes an encoded representation of the video data (1700).

Video decoder 300 may determine, based on the syntax element, that a template-matching tool is enabled (1702). The template-matching tool may be one of: TM-AMVP, GPM split mode reordering, candidate reordering for regular MMVD and affine MMVD, MVD sign prediction, reference picture reordering, template-matching merge mode, template-matching GPM, template-matching CIIP, adaptive reordering of merge candidates, TMVP and non-adjacent merge candidate type reordering, TM-OBMC, IntraTMP, IBC-TM-AMVP, or IBC-TM-AMVP.

Based on the template-matching tool being enabled, template matching unit 322 of video decoder 300 may apply the template-matching tool to generate a prediction block for a current CU of the video data (1704). Template matching unit 322 may generate the prediction block using the template-matching tool as described elsewhere in this disclosure.

Reconstruction unit 310 of video decoder 300 may reconstruct the current CU based on the prediction block for the current CU (1706). For example, reconstruction unit 310 may add samples of the prediction block to corresponding samples of residual data generated by inverse transform processing unit 308.

In some examples, the template-matching tool is a first template-matching tool, the syntax element is a first syntax element, and template matching unit 322 may determine, based on the first syntax element, whether the bitstream includes a syntax element that indicates whether a second template-matching tool is enabled. If so, the template matching unit 322 may use the second template-matching tool for generating a prediction block for a different CU. For example, the first template-matching tool may be template-matching merge mode and the second template-matching tool is template-matching CIIP mode. In other example, the first template-matching tool is ARMC and the second template-matching tool is one of: GPM split mode reordering, candidate reordering for regular MMVD and affine MMVD, MVD sign prediction, reference picture reordering, TMVP and non-adjacent merge candidate type reordering.

The following is a non-limiting list of clauses according to techniques of this disclosure.

Clause 1A: A method of decoding video data includes obtaining a syntax element from a bitstream that includes an encoded representation of the video data; determining, based on the syntax element, that a template-matching tool is enabled; based on the template-matching tool being enabled, applying the template-matching tool to generate a prediction block for a current coding unit (CU) of the video data; and reconstructing the current CU based on the prediction block for the current CU.

Clause 2A: The method of clause 1A, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 3A: The method of any of clauses 1A-2A, wherein: the template-matching tool is a first template-matching tool, and the method further comprises determining, based on the syntax element, whether a second template-matching tool is enabled.

Clause 4A: The method of any of clauses 1A-3A, wherein: the template-matching tool is a first template-matching tool, the syntax element is a first syntax element, and the method further comprises determining, based on the first syntax element, whether the bitstream includes a syntax element that indicates whether a second template-matching tool is enabled.

Clause 5A: The method of clause 1A, wherein: the syntax element is a first syntax element, wherein the first syntax element indicates whether a first set of one or more template-matching tools are enabled, the method further comprises obtaining a second syntax element from the bitstream, wherein the second syntax element indicates whether a second set of one or more template-matching tools are enabled, the first set of template-matching tools involve searching an area around an initial motion vector, and the second set of template-matching tools involve searching within a list of motion vector candidates.

Clause 6A: The method of any of clauses 1A-5A, wherein: the syntax element is a first syntax element, the method further comprises: obtaining a second syntax element from the bitstream, wherein the syntax element is a sequence-level syntax element, a picture-level syntax element, a slice-level syntax element, or a tile-level syntax element; and determining, based on the second syntax element, whether the bitstream includes syntax elements indicating whether template-matching tools are enabled.

Clause 7A: The method of any of clauses 1A-6A, wherein: the method further comprises: based on the syntax element indicating intra-block copy template matching merge mode (IBC-TM-MRG) or intra-block copy template matching advance motion vector prediction (IBC-TM-AMVP) is disabled, setting a pruning threshold to a value; and pruning a first candidate from a list based on a difference between a motion vector component of the first candidate and a motion vector component of a second candidate in the list being less than the pruning threshold, and applying the template-matching tool to generate the prediction block for the current CU comprises applying the template-matching tool to generate the prediction block for the current CU based on a candidate in the list.

Clause 8A: The method of any of clauses 1A-7A, wherein the syntax element is a sequence-level syntax element, a picture-level syntax element, a slice-level syntax element, or a tile-level syntax element.

Clause 9A: A method of encoding video data includes signaling a syntax element in a bitstream that includes an encoded representation of the video data, a syntax element; based on the template-matching tool being enabled, applying the template-matching tool to generate a prediction block for a current coding unit (CU) of the video data; and encoding the current CU based on the prediction block for the current CU.

Clause 10A: The method of clause 9A, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 11A: The method of any of clauses 9A-10A, wherein: the template-matching tool is a first template-matching tool, and the syntax element also indicates whether a second template-matching tool is enabled.

Clause 12A: The method of any of clauses 9A-11A, wherein: the template-matching tool is a first template-matching tool, the syntax element is a first syntax element, and the method further comprises signaling, based on the first syntax element, a second syntax element that indicates whether a second template-matching tool is enabled.

Clause 13A: The method of clause 9A, wherein: the syntax element is a first syntax element, wherein the first syntax element indicates whether a first set of one or more template-matching tools are enabled, the method further comprises signaling a second syntax element in the bitstream, wherein the second syntax element indicates whether a second set of one or more template-matching tools are enabled, the first set of template-matching tools involve searching an area around an initial motion vector, and the second set of template-matching tools involve searching within a list of motion vector candidates.

Clause 14A: The method of any of clauses 9A-13A, wherein: the syntax element is a first syntax element, the method further comprises: signaling a second syntax element in the bitstream, wherein the syntax element is a sequence-level syntax element, a picture-level syntax element, a slice-level syntax element, or a tile-level syntax element; and based on the second syntax element, signaling syntax elements in the bitstream indicating whether template-matching tools are enabled.

Clause 15A: The method of any of clauses 9A-14A, wherein: the method further comprises: based on the syntax element indicating intra-block copy template matching merge mode (IBC-TM-MRG) or intra-block copy template matching advance motion vector prediction (IBC-TM-AMVP) is disabled, setting a pruning threshold to a value; and pruning a first candidate from a list based on a difference between a motion vector component of the first candidate and a motion vector component of a second candidate in the list being less than the pruning threshold, and applying the template-matching tool to generate the prediction block for the current CU comprises applying the template-matching tool to generate the prediction block for the current CU based on a candidate in the list.

Clause 16A: The method of any of clauses 9A-15A, wherein the syntax element is a sequence-level syntax element, a picture-level syntax element, a slice-level syntax element, or a tile-level syntax element, and the syntax element indicates that a template-matching tool is enabled.

Clause 17A: A device for coding video data, the device comprising one or more means for performing the method of any of clauses 1A-16A.

Clause 18A: The device of clause 17A, wherein the one or more means comprise one or more processors implemented in circuitry.

Clause 19A: The device of any of clauses 16A and 17A, further comprising a memory to store the video data.

Clause 20A: The device of any of clauses 17A-19A, further comprising a display configured to display decoded video data.

Clause 21A: The device of any of clauses 17A-20A, wherein the device comprises one or more of a camera, a computer, a mobile device, a broadcast receiver device, or a set-top box.

Clause 22A: The device of any of clauses 17A-21A, wherein the device comprises a video decoder.

Clause 23A: The device of any of clauses 17A-22A, wherein the device comprises a video encoder.

Clause 24A: A computer-readable storage medium having stored thereon instructions that, when executed, cause one or more processors to perform the method of any of clauses 1A-16A.

Clause 1B. A device for decoding video data, the device comprising: a memory comprising one or more storage media, the memory configured to store the video data; and one or more processors implemented in circuitry, the one or more processors configured to: obtain a syntax element from a bitstream that includes an encoded representation of the video data; determine, based on the syntax element, that a template-matching tool is enabled; based on the template-matching tool being enabled, apply the template-matching tool to generate a prediction block for a current coding unit (CU) of the video data; and reconstruct the current CU based on the prediction block for the current CU.

Example 2B. The device of clause 1B, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 3B. The device of any of clauses 1B-2B, wherein: the template-matching tool is a first template-matching tool, the syntax element is a first syntax element, and the one or more processors are further configured to determine, based on the first syntax element, whether the bitstream includes a second syntax element that indicates whether a second template-matching tool is enabled.

Clause 4B. The device of clause 3B, wherein the first template-matching tool is template-matching merge mode and the second template-matching tool is template-matching combined intra/inter prediction (CIIP) mode.

Clause 5B. The device of clause 3B, wherein: the first template-matching tool is adaptive reordering of merge candidates (ARMC), and the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

Clause 6B. The device of any of clauses 1B-5B, wherein: the syntax element is a first syntax element, the one or more processors are further configured to: obtain a second syntax element from the bitstream, wherein the second syntax element is a sequence-level syntax element, a picture-level syntax element, a slice-level syntax element, or a tile-level syntax element; and determine, based on the second syntax element, whether the bitstream includes one or more template-matching tool syntax elements indicating whether one or more template-matching tools are enabled, wherein the template-matching tool syntax elements include the first syntax element.

Clause 7B. The device of clause 6B, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the second syntax element.

Clause 8B. The device of any of clauses 1B-6B, wherein: the one or more processors are further configured to: based on the syntax element indicating intra-block copy template matching merge mode (IBC-TM-MRG) or intra-block copy template matching advance motion vector prediction (IBC-TM-AMVP) is disabled, set a pruning threshold to a value; and prune a first candidate from a list based on a difference between a motion vector component of the first candidate and a motion vector component of a second candidate in the list being less than the pruning threshold, and wherein to apply the template-matching tool to generate the prediction block for the current CU, the one or more processors are configured to apply the template-matching tool to generate the prediction block for the current CU based on a candidate in the list.

Clause 9B. The device of any of clauses 1B-8B, further comprising a display configured to display decoded video data.

Clause 10B. A device for encoding video data, the device comprising: a memory comprising one or more storage media, the memory configured to store the video data; and one or more processors implemented in circuitry, the one or more processors configured to: signal, in a bitstream that includes an encoded representation of the video data, a syntax element that indicates whether a template-matching tool is enabled; based on the template-matching tool being enabled, apply the template-matching tool to generate a prediction block for a current coding unit (CU) of the video data; and encode the current CU based on the prediction block for the current CU.

Clause 11B. The device of clause 10B, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 12B. The device of any of clauses 10B-11B, wherein: the template-matching tool is a first template-matching tool, the syntax element is a first syntax element, and the one or more processors are further configured to signal, based on the first syntax element, a second syntax element that indicates whether a second template-matching tool is enabled.

Clause 13B. The device of clause 12B, wherein the first template-matching tool is template-matching merge mode and the second template-matching tool is template-matching combined intra/inter prediction (CIIP) mode.

Clause 14B. The device of clause 12B, wherein: the first template-matching tool is adaptive reordering of merge candidates (ARMC), and the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

Clause 15B. The device of any of clauses 10B-14B, wherein: the syntax element is a first syntax element, and the one or more processors are further configured to signal a second syntax element in the bitstream, the second syntax element indicates whether the bitstream includes one or more template-matching tool syntax elements, the second syntax element is a sequence-level syntax element, a picture-level syntax element, a slice-level syntax element, or a tile-level syntax element, and the one or more template-matching tool syntax elements include the first syntax element.

Clause 16B. The device of clause 15B, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the second syntax element.

Clause 17B. The device of any of clauses 10B-16B, wherein: the one or more processors are further configured to: based on intra-block copy template matching merge mode (IBC-TM-MRG) or intra-block copy template matching advance motion vector prediction (IBC-TM-AMVP) being disabled, set a pruning threshold to a value; and prune a first candidate from a list based on a difference between a motion vector component of the first candidate and a motion vector component of a second candidate in the list being less than the pruning threshold, and wherein to apply the template-matching tool to generate the prediction block for the current CU, the one or more processors are further configured to apply the template-matching tool to generate the prediction block for the current CU based on a candidate in the list.

Clause 18B. The device of any of clauses 10B-17B, wherein the device comprises one or more of a camera, a computer, a mobile device, a broadcast receiver device, or a set-top box.

Clause 19B. A method of decoding video data, the method comprising: obtaining a syntax element from a bitstream that includes an encoded representation of the video data; determining, based on the syntax element, that a template-matching tool is enabled; based on the template-matching tool being enabled, applying the template-matching tool to generate a prediction block for a current coding unit (CU) of the video data; and reconstructing the current CU based on the prediction block for the current CU.

Clause 20B. The method of clause 19B, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 21B. The method of any of clauses 19B-20B, wherein: the template-matching tool is a first template-matching tool, the syntax element is a first syntax element, and the method further comprises determining, based on the first syntax element, whether the bitstream includes a syntax element that indicates whether a second template-matching tool is enabled.

Clause 22B. The method of any of clauses 19B-21B, wherein: the syntax element is a first syntax element, the method further comprises: obtaining a second syntax element from the bitstream, wherein the second syntax element is a sequence-level syntax element, a picture-level syntax element, a slice-level syntax element, or a tile-level syntax element; and determining, based on the second syntax element, whether the bitstream includes one or more template-matching tool syntax elements indicating whether one or more template-matching tools are enabled, wherein the template-matching tool syntax elements include the first syntax element.

Clause 23B. The method of clause 22B, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) is not dependent on the second syntax element.

Clause 24B. The method of any of clauses 19B-23B, wherein: the method further comprises: based on the syntax element indicating intra-block copy template matching merge mode (IBC-TM-MRG) or intra-block copy template matching advance motion vector prediction (IBC-TM-AMVP) is disabled, setting a pruning threshold to a value; and pruning a first candidate from a list based on a difference between a motion vector component of the first candidate and a motion vector component of a second candidate in the list being less than the pruning threshold, and applying the template-matching tool to generate the prediction block for the current CU comprises applying the template-matching tool to generate the prediction block for the current CU based on a candidate in the list.

Clause 25B. A method of encoding video data, the method comprising: signaling, in a bitstream that includes an encoded representation of the video data, a syntax element that indicates whether a template-matching tool is enabled; based on the template-matching tool being enabled, applying the template-matching tool to generate a prediction block for a current coding unit (CU) of the video data; and encoding the current CU based on the prediction block for the current CU.

Clause 26B. The method of clause 25B, wherein the template-matching tool is one of: template-matching advanced motion vector prediction (TM-AMVP), geometric partitioning mode (GPM) split mode reordering, candidate reordering for regular merge mode with motion vector difference (MMVD) and affine MMVD, motion vector difference (MVD) sign prediction, reference picture reordering, template-matching merge mode, template-matching GPM, template-matching combined inter-intra prediction (CIIP), adaptive re-ordering of merge candidates, temporal motion vector prediction (TMVP) and non-adjacent merge candidate type reordering, template-matching overlapped block motion compensation (TM-OBMC), intra template matching prediction (IntraTMP), intra-block copy-template matching-advanced motion vector prediction (IBC-TM-AMVP), or intra-block copy-template matching-merge (IBC-TM-AMVP).

Clause 27B. The method of any of clauses 25B-26B, wherein: the template-matching tool is a first template-matching tool, the syntax element is a first syntax element, and the method further comprises signaling, based on the first syntax element, a second syntax element that indicates whether a second template-matching tool is enabled.

Clause 28B. The method of clause 27B, wherein: the first template-matching tool is adaptive reordering of merge candidates (ARMC), and the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

Clause 30B. The method of any of clauses 25B-29B, wherein: the syntax element is a first syntax element, the method further comprises signaling a second syntax element in the bitstream, the second syntax element indicates whether the bitstream includes one or more template-matching tool syntax elements, the second syntax element is a sequence-level syntax element, a picture-level syntax element, a slice-level syntax element, or a tile-level syntax element, and the one or more template-matching tool syntax elements include the first syntax element.

Clause 31B. The method of any of clauses 25B-29B, wherein: the method further comprises: based on intra-block copy template matching merge mode (IBC-TM-MRG) or intra-block copy template matching advance motion vector prediction (IBC-TM-AMVP) being disabled, setting a pruning threshold to a value; and pruning a first candidate from a list based on a difference between a motion vector component of the first candidate and a motion vector component of a second candidate in the list being less than the pruning threshold, and applying the template-matching tool to generate the prediction block for the current CU comprises applying the template-matching tool to generate the prediction block for the current CU based on a candidate in the list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding video data, the device comprising:
    a memory comprising one or more storage media, the memory configured to store the video data; and
    one or more processors implemented in circuitry, the one or more processors configured to:
        obtain at least one syntax element from a bitstream that includes an encoded representation of the video data;
        determine, based on the at least one syntax element, that a template-matching tool is enabled;
        based on the at least one syntax element indicating intra-block copy template matching merge mode (IBC-TM-MRG) or intra-block copy template matching advance motion vector prediction (IBC-TM-AMVP) is disabled, set a pruning threshold to a value;
        prune a first candidate from a list based on a difference between a motion vector component of the first candidate and a motion vector component of a second candidate in the list being less than the pruning threshold;
        based on the template-matching tool being enabled, apply the template-matching tool to generate a prediction block for a current coding unit (CU) of the video data based on a candidate in the list; and
        reconstruct the current CU based on the prediction block for the current CU.

2. The device of claim 1, wherein the template-matching tool is one of:
    template-matching advanced motion vector prediction (TM-AMVP),
    geometric partitioning mode (GPM) split mode reordering,
    candidate reordering for regular merge mode with motion vector difference (MMVD) and affine MMVD,
    motion vector difference (MVD) sign prediction,
    reference picture reordering,
    template-matching merge mode,
    template-matching GPM,
    template-matching combined inter-intra prediction (CIIP),
    adaptive re-ordering of merge candidates,
    temporal motion vector prediction (TMVP) and non-adjacent merge candidate type reordering,
    template-matching overlapped block motion compensation (TM-OBMC),
    intra template matching prediction (IntraTMP),
    intra-block copy-template matching-advanced motion vector prediction (IBC-TM-AMVP), or
    intra-block copy-template matching-merge (IBC-TM-AMVP).

3. The device of claim 1, wherein:
    the template-matching tool is a first template-matching tool,
    the at least one syntax element is a first syntax element, and
    the one or more processors are further configured to determine, based on the first syntax element, whether the bitstream includes a second syntax element that indicates whether a second template-matching tool is enabled.

4. The device of claim 3, wherein the first template-matching tool is template-matching merge mode and the second template-matching tool is template-matching combined intra/inter prediction (CIIP) mode.

5. The device of claim 3, wherein:
    the first template-matching tool is adaptive reordering of merge candidates (ARMC), and
    the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

6. The device of claim 1, wherein:
    the at least one syntax element is a first syntax element,
    the one or more processors are further configured to:
        obtain a second syntax element from the bitstream, wherein the second syntax element is a sequence-level syntax element, a picture-level syntax element, a slice-level syntax element, or a tile-level syntax element; and determine, based on the second syntax element, whether the bitstream includes one or more template-matching tool syntax elements indicating whether one or more template-matching tools are enabled, wherein the one or more template-matching tool syntax elements include the first syntax element.

7. The device of claim 6, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the second syntax element.

8. The device of claim 1, further comprising a display configured to display decoded video data.

9. A device for encoding video data, the device comprising:
- a memory comprising one or more storage media, the memory configured to store the video data; and
- one or more processors implemented in circuitry, the one or more processors configured to:
  - based on intra-block copy template matching merge mode (IBC-TM-MRG) or intra-block copy template matching advance motion vector prediction (IBC-TM-AMVP) being disabled, set a pruning threshold to a value;
  - prune a first candidate from a list based on a difference between a motion vector component of the first candidate and a motion vector component of a second candidate in the list being less than the pruning threshold;
  - based on a template-matching tool being enabled, apply the template-matching tool to generate a prediction block for a current coding unit (CU) of the video data based on a candidate in the list;
  - encode the current CU based on the prediction block for the current CU;
  - signal, in a bitstream that includes an encoded representation of the video data, at least one syntax element that indicates that the template-matching tool is enabled.

10. The device of claim 9, wherein the template-matching tool is one of:
- template-matching advanced motion vector prediction (TM-AMVP),
- geometric partitioning mode (GPM) split mode reordering,
- candidate reordering for regular merge mode with motion vector difference (MMVD) and affine MMVD,
- motion vector difference (MVD) sign prediction,
- reference picture reordering,
- template-matching merge mode,
- template-matching GPM,
- template-matching combined inter-intra prediction (CIIP),
- adaptive re-ordering of merge candidates,
- temporal motion vector prediction (TMVP) and non-adjacent merge candidate type reordering,
- template-matching overlapped block motion compensation (TM-OBMC),
- intra template matching prediction (IntraTMP),
- intra-block copy-template matching-advanced motion vector prediction (IBC-TM-AMVP), or
- intra-block copy-template matching-merge (IBC-TM-AMVP).

11. The device of claim 9, wherein:
- the template-matching tool is a first template-matching tool,
- the at least one syntax element is a first syntax element, and
- the one or more processors are further configured to signal, based on the first syntax element, a second syntax element that indicates whether a second template-matching tool is enabled.

12. The device of claim 11, wherein the first template-matching tool is template-matching merge mode and the second template-matching tool is template-matching combined intra/inter prediction (CIIP) mode.

13. The device of claim 11, wherein:
- the first template-matching tool is adaptive reordering of merge candidates (ARMC), and
- the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

14. The device of claim 9, wherein:
- the at least one syntax element is a first syntax element, and
- the one or more processors are further configured to signal a second syntax element in the bitstream,
- the second syntax element indicates whether the bitstream includes one or more template-matching tool syntax elements,
- the second syntax element is a sequence-level syntax element, a picture-level syntax element, a slice-level syntax element, or a tile-level syntax element, and
- the one or more template-matching tool syntax elements include the first syntax element.

15. The device of claim 14, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) are enabled is not dependent on the second syntax element.

16. The device of claim 9, wherein the device comprises one or more of a camera, a computer, a mobile device, a broadcast receiver device, or a set-top box.

17. A method of decoding video data, the method comprising:
- obtaining at least one syntax element from a bitstream that includes an encoded representation of the video data;
- determining, based on the at least one syntax element, that a template-matching tool is enabled;
- based on the at least one syntax element indicating intra-block copy template matching merge mode (IBC-TM-MRG) or intra-block copy template matching advance motion vector prediction (IBC-TM-AMVP) is disabled, setting a pruning threshold to a value;
- pruning a first candidate from a list based on a difference between a motion vector component of the first candidate and a motion vector component of a second candidate in the list being less than the pruning threshold;
- based on the template-matching tool being enabled, applying the template-matching tool to generate a prediction block for a current coding unit (CU) of the video data based on a candidate in the list; and reconstructing the current CU based on the prediction block for the current CU.

18. The method of claim 17, wherein the template-matching tool is one of:
template-matching advanced motion vector prediction (TM-AMVP),
geometric partitioning mode (GPM) split mode reordering,
candidate reordering for regular merge mode with motion vector difference (MMVD) and affine MMVD,
motion vector difference (MVD) sign prediction,
reference picture reordering,
template-matching merge mode,
template-matching GPM,
template-matching combined inter-intra prediction (CIIP),
adaptive re-ordering of merge candidates,
temporal motion vector prediction (TMVP) and non-adjacent merge candidate type reordering,
template-matching overlapped block motion compensation (TM-OBMC),
intra template matching prediction (IntraTMP),
intra-block copy-template matching-advanced motion vector prediction (IBC-TM-AMVP), or
intra-block copy-template matching-merge (IBC-TM-AMVP).

19. The method of claim 17, wherein:
the template-matching tool is a first template-matching tool,
the at least one syntax element is a first syntax element, and
the method further comprises determining, based on the first syntax element, whether the bitstream includes a syntax element that indicates whether a second template-matching tool is enabled.

20. The method of claim 17 wherein:
the at least one syntax element is a first syntax element,
the method further comprises:
  obtaining a second syntax element from the bitstream, wherein the second syntax element is a sequence-level syntax element, a picture-level syntax element, a slice-level syntax element, or a tile-level syntax element; and
  determining, based on the second syntax element, whether the bitstream includes one or more template-matching tool syntax elements indicating whether one or more template-matching tools are enabled, wherein the one or more template-matching tool syntax elements include the first syntax element.

21. The method of claim 20, wherein presence of syntax elements indicating whether intra template matching prediction (intraTMP), intra block copy template matching with advanced motion vector prediction (IBC-TM-AMVP), and intra block copy template matching with merge mode (IBC-TM-AMVP) is not dependent on the second syntax element.

22. A method of encoding video data, the method comprising:
based on intra-block copy template matching merge mode (IBC-TM-MRG) or intra-block copy template matching advance motion vector prediction (IBC-TM-AMVP) being disabled, setting a pruning threshold to a value;
pruning a first candidate from a list based on a difference between a motion vector component of the first candidate and a motion vector component of a second candidate in the list being less than the pruning threshold;
based on a template-matching tool being enabled, applying the template-matching tool to generate a prediction block for a current coding unit (CU) of the video data based on a candidate in the list;
encoding the current CU based on the prediction block for the current CU;
signaling, in a bitstream that includes an encoded representation of the video data, at least one syntax element that indicates that the template-matching tool is enabled.

23. The method of claim 22, wherein the template-matching tool is one of:
template-matching advanced motion vector prediction (TM-AMVP),
geometric partitioning mode (GPM) split mode reordering,
candidate reordering for regular merge mode with motion vector difference (MMVD) and affine MMVD,
motion vector difference (MVD) sign prediction,
reference picture reordering,
template-matching merge mode,
template-matching GPM,
template-matching combined inter-intra prediction (CIIP),
adaptive re-ordering of merge candidates,
temporal motion vector prediction (TMVP) and non-adjacent merge candidate type reordering,
template-matching overlapped block motion compensation (TM-OBMC),
intra template matching prediction (IntraTMP),
intra-block copy-template matching-advanced motion vector prediction (IBC-TM-AMVP), or
intra-block copy-template matching-merge (IBC-TM-AMVP).

24. The method of claim 22, wherein:
the template-matching tool is a first template-matching tool,
the at least one syntax element is a first syntax element, and
the method further comprises signaling, based on the first syntax element, a second syntax element that indicates whether a second template-matching tool is enabled.

25. The method of claim 24, wherein:
the first template-matching tool is adaptive reordering of merge candidates (ARMC), and
the second template-matching tool is one of: geometric partitioning mode (GPM) split mode reordering, candidate reordering for regular merge mode with motion vector difference (MMVD) and affine MMVD, motion vector difference (MVD) sign prediction, reference picture reordering, temporal motion vector prediction (TMVP) or non-adjacent merge candidate type reordering.

26. The method of claim 22, wherein:
the at least one syntax element is a first syntax element,
the method further comprises signaling a second syntax element in the bitstream,
the second syntax element indicates whether the bitstream includes one or more template-matching tool syntax elements,
the second syntax element is a sequence-level syntax element, a picture-level syntax element, a slice-level syntax element, or a tile-level syntax element, and
the one or more template-matching tool syntax elements include the first syntax element.

* * * * *